United States Patent
Nemri et al.

(10) Patent No.: US 12,451,214 B2
(45) Date of Patent: Oct. 21, 2025

(54) HAPLOTYPE-BLOCK-BASED IMPUTATION OF GENOMIC MARKERS

(71) Applicants: KWS SAAT SE & CO. KGAA, Einbeck (DE); GEORG-AUGUST-UNIVERSITAET GOETTINGEN STIFTING OEFFENTLICHEN RECHTS, Goettingen (DE)

(72) Inventors: Adnane Nemri, Montpellier (FR); Torsten Pook, Goettingen (DE)

(73) Assignees: KWS SAAT SE & CO. KGAA, Einbeck (DE); GEORG-AUGUST-UNIVERSITAET GOETTINGEN STIFTING OEFFENTLICHEN RECHTS, Goettingen (DE)

( * ) Notice: Subject to any disclaimer, the term of this patent is extended or adjusted under 35 U.S.C. 154(b) by 183 days.

(21) Appl. No.: 18/030,602

(22) PCT Filed: Oct. 6, 2021

(86) PCT No.: PCT/EP2021/077505
§ 371 (c)(1),
(2) Date: Apr. 6, 2023

(87) PCT Pub. No.: WO2022/074034
PCT Pub. Date: Apr. 14, 2022

(65) Prior Publication Data
US 2023/0368864 A1     Nov. 16, 2023

(30) Foreign Application Priority Data
Oct. 9, 2020   (EP) .................................. 20201121

(51) Int. Cl.
G16B 20/00  (2019.01)
G16B 35/00  (2019.01)
G16H 50/30  (2018.01)

(52) U.S. Cl.
CPC ............. *G16B 20/00* (2019.02); *G16B 35/00* (2019.02); *G16H 50/30* (2018.01)

(58) Field of Classification Search
None
See application file for complete search history.

(56) References Cited

U.S. PATENT DOCUMENTS

| | | | |
|---|---|---|---|
| 10,255,330 B2 * | 4/2019 | Chandratillake | G16B 20/20 |
| 2003/0099964 A1 * | 5/2003 | Patil | G16B 30/00 |
| | | | 435/6.16 |

(Continued)

OTHER PUBLICATIONS

Scheet, Paul, et al., "A Fast and Flexible Statistical Model for Large-Scale Population Genotype Data: Applications to Inferring Missing Genotypes and Haplotypic Phase", The American Journal of Human Genetics, Apr. 2006, vol. 78, pp. 629-644.

(Continued)

*Primary Examiner* — Robert A Sorey
(74) *Attorney, Agent, or Firm* — PERRY + CURRIER INC.

(57) ABSTRACT

The invention relates to a computer-implemented method for predicting a genome-related feature (458) from genomic data of multiple individuals (402), the method comprising: —receiving (102) genomic marker data (434, 442) of each of the individuals, the genomic marker data being indicative of a plurality of first marker positions assigned to identified marker variants (1140-1142) and multiple second (1144) marker positions have a missing or ambiguous marker variant assignment; —computing (104) a haplotype-block library (448) comprising a plurality of haplotype-blocks (1126-1136), each haplotype-block comprising start and stop (Continued)

coordinates and a series of marker positions referred to as 'comparison marker positions' lying within the start and stop coordinates; —performing (106) a haplotype-block-guided marker imputation; —supplementing (108) the genomic marker data with the imputed marker variants; and—using the supplemented genomic marker data (454) for computationally predicting the feature (458) of the individuals.

14 Claims, 13 Drawing Sheets

(56) References Cited

U.S. PATENT DOCUMENTS

| | | | | |
|---|---|---|---|---|
| 2003/0170665 | A1* | 9/2003 | Daly | C12Q 1/6876 702/20 |
| 2007/0111247 | A1* | 5/2007 | Stephens | C12Q 1/6827 702/20 |
| 2009/0270332 | A1* | 10/2009 | Bare | G01N 35/00 514/56 |
| 2011/0086346 | A1* | 4/2011 | Davis | C12Q 1/6886 435/5 |

OTHER PUBLICATIONS

Howie, Bryan N., et al., "A Flexible and Accurate Genotype Imputation Method for the Next Generation of Genome-Wide Association Studies", PLoS Genetics, Jun. 2009, vol. 5, Issue 6, e1000529.

Delaneau, Olivier, et al., "A Linear Complexity Phasing Method for Thousands of Genomes", Nature Methods, vol. 9, No. 2, Feb. 2012, pp. 179-181.

Browning, Brian L., et al., "A One-Penny Imputed Genome from Next-Generation Reference Panels", The American Journal of Human Genetics, 103, Sep. 6, 2018, pp. 338-348.

Das, Sayantan, et al., "Genotype Imputation from Large Reference Panels", Annu. Rev. Genomics Hum. Genet. May 23, 2018, 19: 73-96.

Li, Heng, et al., "Fast and Accurate Short Read Alignment with Burrows-Wheeler Transform", Bioinformatics, Vo. 25, No. 14, 2009, pp. 1754-1760, Downloaded from https://academic.oup.com/bioinformatics/article/25/14/1754/225615 by guest on Mar. 23, 2023.

Garrison, Erik., et al., "Haplotype-based Variant Detection from Short-read Sequencing", arXiv:1207.3907v2 [q-bio.GN] Jul. 20, 2012.

McKenna, Aaron, et al., "The Genome Analysis Toolkit: A MapReduce Framework for Analyzing Next-Generation DNA Sequencing Data", Genome Research, Cold Spring Harbor Laboratory Press; ISSN 1088-9051/10; p. 1297-1303.

Loh, Po-Ru, et al., "Fast and Accurate Long-Range Phasing in a UK Biobank Cohort", Nat Genet. Jul. 2016; 48(7): 811-816.

Choi, Yongwook, et al., "Comparison of Phasing Strategies for Whole Human Genomes", PLOS Genetics | https://doi.org/10.1371/journal.pgen.1007308 Apr. 5, 2018.

Pook, Torsten, et al., "HoploBlocker: Creation of Subgroup-Specific Haplotype Blocks and Llibraries", Genetics, vol. 212, No. 4, May 31, 2019, pp. 1045-1061.

Unterseer, Sandra, "A Powerful Tool for Genome Analysis in Maize: Development and Evaluation of the Nigh Density 600 k SNP Genotyping Array", BioMed Central, http://www.biomedcentral.com/1471-2164/15/823.

Holker, Armin, et al., "European Maize Landraces Made Accessible for Plant Breeding and Genomre-Based Studies", Theoretical and Applied Genetics, Sep. 26, 2019, 132:3333-3345, https://doi.org/10.1007/s00122-019-03428-8.

Nadaraya, E.A., "On Estimating Regression", Theor. Veroyatnost. i Primenen., 1964, vol. 9, Issue 1, 157-159.

Jung, Ho-Youl, et al., "New Methods for Imputation of Missing Genotype Using Linkage Disequilibrium and Haplotype Information", Information Science, Amsterdam, NL, vol. 177, No. 3, Nov. 10, 2006, pp. 804-814; XP 5758232.

Cuyabano, Beatriz CD., et al., "Selection of Hyplotype Variables from a High-Density Marker Map for Genomic Prediction", Genetics Selection Evolution, EDP Sciences, Les Ulis, FR, vol. 47, No. 1, Aug. 1, 2015, age 61, XP21225605AI.

Alipour, Hadi, et al., "Imputation Accuracy of Wheat Genotyping-by-Sequencing (GBS) Data using Barley and Wheat Genome References", PLOS One, vol. 14, No. 1, Jan. 7, 2019, p. e0208614, XP055782446.

Pook, Torsten, et a., "Increasing Calling Accuracy, Coverage, and Read Depth in Sequence Data by the Use of Haplotype Blocks", BioRxiv, Jan. 8, 2021, XP055782625.

Vanmontfort, D., "Extended European Search Report", mailed Mar. 18, 2021, issued in corresponding European Patent Application No. 20201121.9, Filed Oct. 9, 2020.

Sulberg, Anna, "Internaltional Search Report", mailed Jan. 19, 2022, issued in corresponding PCT Patent Application No. PCT/EP2021/077505, filed Oct. 6, 2021.

Marchini, Jonathan, et al. "A new multipoint method for genome-wide association studies by imputation of genotypes." Nature genetics 39.7 (2007): 906-913.

Marchini, Jonathan et al., "Genotype imputation for genome-wide association studies." Nature Reviews Genetics 11.7 (2010): 499-511.

* cited by examiner

Before Imputation

Matrix to be imputed, line/position „3"  ⎯ 434/450

|  | A | B | C |
|---|---|---|---|
| 604 — 3 | 0 (1;0) | - (0;0) | 0 (2;0) |

832 — 834 — 836     838 — 840 — 842

After Imputation

Imputed/Supplemented Marker Data, line/position „3"  ⎯ 454

|  | A | B | C |
|---|---|---|---|
| 604 — 3 | 0 (1;0) | 0* | 0 (2;0) |

|  | A | B | C (814) | D | E | F | 454.1 |
|---|---|---|---|---|---|---|---|
| 1 | 1* | 1 (0;3) | 1 (1;3) | 0 (2;0) | 0 (1;0) | 1 (0;2) | |
| 3  604 | 0 (1;0) | 0* | 0 (2;0) | 1* | 1 (0;1) | 0 (3;1) | |
| 6 | 0 (2;1) | 0* | 0 (2;0) | 1* | 1 (0;2) | 0 (1;0) | |
| 7 | 0* | 0 (2;0) | 0 (1;0) | - (0;0) | - (0;0) | 1 (0;2) | |
| 10 | 1 (0;2) | 0 (1;0) | - (0;0) | 1 (0;2) | 1* | - (0;0) | |
| 11 | 1 (0;1) | 1 (0;2) | 1* | 0 (2;1) | 0 (1;0) | 0 (1;0) | |
| 14 | 0 (2;1) | 0* | 0* | 1* | 0* | 1 (1;2) | |
| 16 | - (0;0) | - (0;0) | - (0;0) | 1 (1;3) | - (0;0) | 1 (0;2) | |
| 19 | 1* | 1* | 1 (0;1) | 1 (0;1) | 1 (0;2) | 1* | |
| 20 | 1* | 1 (0;2) | 1 (0;1) | 0 (1;0) | 1 (0;1) | 0 (1;0) | |

*Imputed positions are annotated with asterisks*

Fig. 9B

Before Imputation

|     |    | A      | B      | C      | D      | E      | F      |
|-----|----|--------|--------|--------|--------|--------|--------|
| 616 | 16 | - (0;0)| - (0;0)| - (0;0)| 1 (1;3)| - (0;0)| 1 (0;2)|

Matrix to be imputed, line/position „16"

After Imputation

|     |       | A   | B   | C   | D    | E   | F    |
|-----|-------|-----|-----|-----|------|-----|------|
| 616 | 16    | 0*  | 0*  | 0*  | 1*   | 0*  | 1*   |
|     | 16CNV | DEL | DEL | DEL | MULT | DEL | MULT |

Imputed/Supplemented Structural Marker Variants in additional line 16CNV

|    | A      | B      | C      | D      | E      | F      |
|----|--------|--------|--------|--------|--------|--------|
| 1  | 1*     | 1 (0;3)| 1 (1;3)| 0 (2;0)| 0 (1;0)| 1 (0;2)|
| 3  | 0 (1;0)| 0*     | 0 (2;0)| 1*     | 1 (0;1)| 0 (3;1)|
| 6  | 0 (2;1)| 0*     | 0 (2;0)| 1*     | 1 (0;2)| 0 (1;0)|
| 7  | 0*     | 0 (2;0)| 0 (1;0)| - (0;0)| - (0;0)| 1 (0;2)|
| 10 | 1 (0;2)| 0 (1;0)| - (0;0)| 1 (0;2)| 1*     | - (0;0)|
| 11 | 1 (0;1)| 1 (0;2)| 1*     | 0 (2;1)| 0 (1;0)| 0 (1;0)|
| 14 | 0 (2;1)| 0*     | 0*     | 1*     | 0*     | 1 (1;2)|
| 16 | 0*     | 0*     | 0*     | 1*     | 0*     | 1*     |
| 19 | 1*     | 1*     | 1 (0;1)| 1 (0;1)| 1 (0;2)| 1*     |
| 20 | 1*     | 1 (0;2)| 1 (0;1)| 0 (1;0)| 1 (0;1)| 0 (1;0)|

814

*Imputed positions are annotated with asterisks*

Fig. 10B

HAPLOTYPE-BLOCK-BASED IMPUTATION OF GENOMIC MARKERS

TECHNICAL FIELD

The invention relates to the technical field of genomic prediction, in particular the improvement of genomic-marker-based predictions.

BACKGROUND

The genotyping of large numbers of individuals as well as other high-throughput applications relying on the processing of large amounts of genomic data remains a challenge in many fields of research and technology, e.g. plant genetics, breeding projects and genome-wide association studies. Cost, precision, and throughput must be balanced to achieve acceptable results in terms of prediction quality, efficiency and effort given existing technologies.

Currently, high-throughput genotyping is performed primarily using single nucleotide polymorphism (SNP) arrays. These arrays can have various densities, e.g. 10 k, 50 k or 600 k SNPs. Arrays are relatively straightforward to use and typically produce robust genotyping with relatively few missing calls and calling errors. However, they are expensive, and the SNPs covered in an array may not cover precisely the gene variant(s) that is(are) considered to be particularly relevant in a given application. In recent years, rapid advances in next-generation sequencing (NGS) have enabled targeted genotyping-by-sequencing (GBS) and whole-genome-sequencing (WGS) to become cheaper, more accurate and widely available. Compared to genotyping arrays, GBS and WGS have several advantages including the ability to detect de novo variant positions, the ability to detect multi-allelic variant positions, the versatility of the array across genetic material of many different origins, and the technical simplicity of the experimental design (no chip-design).

A main limitation of NGS and WGS is that the costs of sequencing increase almost linearly with rising average read depth. Therefore, the generation of sequencing data with adequate read depth is still too costly for most applications involving the generation of genomic data for a large number of individuals, e.g. most routine breeding applications or large genome-wide association studies (GWAs). Low-depth genomic sequence data can meanwhile be generated at acceptable costs but often does not allow performing genomic predictions with acceptable accuracy: due to random aspect of sequencing in sampling from genomic reads, not all variants are called in a whole-genome sequencing based genotyping at low to very-low depth (e.g. below 1-2×). In the context of a sequenced population, virtually every variant position displays significant amounts of missing calls.

There exist methods of computationally predicting and filling these "genomic marker gaps" prior to performing a genomic prediction. This in silico procedure is referred to as imputation. Over the years a variety of approaches for genomic marker imputation have been proposed, see e.g. Paul Scheet and Matthew Stephens: "A Fast and Flexible Statistical Model for Large-Scale Population Genotype Data: Applications to Inferring Missing Genotypes and Haplotypic Phase", Am J Hum Genet. 2006 April, 78(4): 629-644; Marchini, J et al.: "A new multipoint method for genome-wide association studies by imputation of genotypes", Nat. Genet. 39, 906 (2007); Howie B N, Donnelly P, Marchini J.: "A flexible and accurate genotype imputation method for the next generation of genome-wide association studies", PLoS Genet. 2009, 5(6); Delaneau O, Marchini J, Zagury J F.: "A linear complexity phasing method for thousands of genomes", Nat Methods. 2011, 9(2):179-181; Browning B L, Zhou Y, Browning S R: "A One-Penny Imputed Genome from Next-Generation Reference Panels", Am J Hum Genet. 2018, 103(3):338-348, 2018. A detailed review and comparisons between commonly used imputation software is provided by J. Marchini and B. Howie: "Genotype imputation for genome-wide association studies", Nature Reviews Genetics", 2010 and by Das S, Abecasis G R, Browning B L.: "Genotype Imputation from Large Reference Panels", Annu. Rev. Genomics Hum. Genet. 2018, 19:73-96.

However, genomic marker imputation based on sequencing data with low to very low read-depth has been observed to provide genomic predictions with poor accuracy. One of the limitations of imputation when working with genotyping data derived from low read depth sequencing has been the challenge of phasing the reads, causing imputation error rates to increase.

Therefore, genotyping arrays are still considered the gold standard in high throughput quantitative genetics.

SUMMARY

The invention provides for a method and system for predicting a genomic feature making use of an improved approach for genomic imputation as specified in the independent claims. Embodiments of the invention are given in the dependent claims. Embodiments of the present invention can be freely combined with each other if they are not mutually exclusive.

In one aspect, the invention relates to a computer-implemented method for predicting a genome-related feature from genomic marker data of multiple individuals. The method comprises:

receiving genomic marker data of each of the multiple individuals; each of the multiple individuals comprises one haplotype or multiple haplotypes; the genomic marker data of each individual is indicative of a plurality of marker positions in the genome of the said individual, wherein first ones of the marker positions are respectively assigned to a marker variant identified at this first marker position, and wherein multiple second ones of the marker positions have a missing or ambiguous marker variant assignment;

computing a haplotype-block library comprising a plurality of haplotype-blocks, each haplotype-block comprising start and stop coordinates and a series of marker positions referred to as 'comparison marker positions' lying within the start and stop coordinates;

performing (106) a haplotype-block-guided marker imputation of marker variants at the second marker positions selectively within genomic sub-regions whose start and stop coordinates correspond to the start and stop coordinates of one or more of the haplotype-blocks, whereby the imputation is computed as a function of marker variants comprised in the genomic sub-regions of a sub-set of the haplotypes, the sub-set of the haplotypes comprising the one or more haplotype-blocks;

supplementing the genomic marker data of the multiple individuals by assigning the imputed marker variants to respective ones of the second marker positions;

using the supplemented genomic marker data for computationally predicting the feature of the individuals.

Embodiments of the invention may have the advantage that the quality of incomplete genomic marker data is improved by haplotype-block-guided marker imputation to such an extent that it can be used as a basis for the accurate prediction of genomic features. Hence, cheap array data which may provide only a coarse-grained, insufficient coverage of relevant genomic markers can be supplemented with imputed genomic markers to a sufficient degree as to allow complex genomic predictions and/or genome-wide association studies. Likewise, cheap genomic sequencing data having a low read depth can be supplemented with imputed genomic markers and may then be used as basis for accurate feature prediction based on large amounts of supplemented genomic marker data whose original read-depth may be too low to provide acceptable prediction accuracy.

Hence, embodiments of the invention may have the advantage that WGS and GBS data imputed by executing the above-mentioned method may provide valid alternatives to both expensive high-density sequencing data and arrays in terms of costs and to low-density sequencing data and arrays in terms of genotyping accuracy and power.

Using a haplotype-block library as the basis for genomic marker imputation may ascertain which haplotypes or individuals carry the same genomic markers (e.g. alleles, SNPs, etc. of the haplotypes. This may allow merging marker-related information across multiple individuals and allows filling the missing/ambiguous marker information at a particular marker position selectively based on individuals or haplotypes comprising the same haplotype-block in their genome at the said genomic position. This allows imputing missing data points for the whole population of individuals sharing the same haplotype-block. As a result, an increased read coverage for the individuals/haplotypes whose markers are imputed is achieved.

Embodiments of the invention may greatly improve the calling rate and may allow the calling of structural variants even from sparse/low quality genomic data: applicant observed that an embodiment of the invention tested on a dataset of 321 doubled haploid lines of a European maize landrace which were sequenced with 0.5× read depth was able to cut imputation error rates in half compared to the state-of-the-art software BEAGLE. Furthermore, embodiments of the invention enable the identification of structural variation, as the average read-depth in the data panel was increased locally by about a hundredfold, leading to a data structure similar to high-depth data. In a further beneficial aspect, a higher calling accuracy and lower rates of missing calls may be achieved. Embodiments allow computationally improving low quality/low coverage genomic marker data based on shared haplotype-blocks, which provides more accurate results than e.g. a marker imputation based on the totality of marker data obtained for the multiple individuals. The haplotype-block library is used to artificially increase the read coverage inside of the haplotype-blocks by taking into account genomic sequences of all haplotypes comprising a particular haplotype-block, thereby increasing the accuracy of the calling process. The haplotype-block-guided marker imputation does not only impute missing markers, but can also correct erroneous marker variant calls: state of the art marker variant calling software often aligns reads falsely leading to wrong, ambiguous calls. These ambiguous and wrong marker variant calls can be corrected using the haplotype-block guided marker imputation method described herein for embodiments of the invention. Hence, accuracy and efficiency of genotyping like that observed from high-coverage genomic sequencing data can be approached using low-coverage sequencing data as input, thereby providing high-quality data at very low costs.

Hence, embodiments of the invention allow for whole-genome sequencing-based predictions using low-cost, low-depth genomic data hitherto considered unsuitable for routine genotyping and similar tasks. Embodiments of the invention outperform array-based genotyping and prediction approaches for cost, simplicity, versatility across species, power and accuracy. As such, embodiments of the invention may render array-based genotyping obsolete over the next few years. The cost per datapoint (genomic marker) in some cases has been observed to be orders of magnitude less using embodiments of the invention compared to existing state-of-art array genotyping-based approaches.

Contrary to array data, embodiments of the invention may allow typing and imputing multi-allelic (multi-marker-variants) sites; typing and imputing complex marker variants, such as nested SNPs inside structural variants; and/or typing and imputing short indels.

An ambiguous association with a marker variant can be, for example, sequence data obtained from a particular haplotype which comprises a marker position that is associated with a first sequence read being indicative of a variant V1 of a particular genomic marker and that is in addition associated with a sequence read being indicative of a variant V2 of this genomic marker. As there can exist only one marker per position per haplotype (at least for marker types such as SNPs, the situation for structural markers may be more complex, e.g. when a DNA segment is present in multiple copies in the genome and comprises a mutation in just some of those copies), one of the two variants V1, V2 assigned to this marker position must be erroneous. Likewise, in case the DNA probes of an array comprise multiple alternative and mutually exclusive variants V1, V2 for a particular marker at a particular marker position, and the array has generated a signal for two or more of these marker variants, then all but one and potentially all these signals are erroneous and considered ambiguous.

According to embodiments, the genomic sub-region whose start and stop coordinates corresponds to the start and stop coordinates of the haplotype-block is a genomic sub-region that was aligned or can be aligned with the genomic sequence of the haplotype-block lying within the start and stop coordinates of the haplotype-block. This genomic sub-region can be identified, for example, by aligning a haplotype with a haplotype-block. The alignment can be performed based on a comparison of nucleotide sequences or based on the comparison of marker variants or marker variant sequences in the haplotype and in the haplotype-block. According to other embodiments, a reference genome is used to serve as a coordinate system both for the haplotype-blocks and the haplotypes and the alignment is performed against the reference genome. A successful alignment can be an alignment over the complete length of the aligned genomic sub-regions or can be an alignment comprising some gaps or mismatches over the complete length of the aligned genomic sub-regions (haplotype-block, genomic sub-region of a haplotype and/or reference genome sub-region).

According to embodiments, the receiving of data can comprise reading the data from a remote or local data storage medium, e.g. a cloud storage, or receiving the data from a remote computer system via a network. Likewise, the data can be received via an interface of a sequencing apparatus or via an interface of a DNA array reading device. In some embodiments, some marker variants may even be annotated manually by a user, e.g. via a GUI.

According to embodiments, the performing of the haplotype-block-guided marker imputation comprises, for each of the haplotypes of the multiple individuals, selecting the one or more genomic sub-regions in this haplotype whose start and stop coordinates correspond to the start and stop coordinates of one or more of the haplotype-blocks. For each of the one or more selected genomic sub-regions of the haplotype and for each first and/or second marker position lying within the selected genomic sub-region, the performing of the haplotype-block-guided marker imputation comprises:
- identifying one or more of the haplotype-blocks comprised in this haplotype and whose start and stop coordinates delimit a genomic sub-region covering the marker position;
- identifying a sub-set of the haplotypes of the individuals, the haplotypes of the subset being haplotypes comprising the said one or more identified haplotype-blocks;
- identifying the marker variant that is assigned most frequently to this marker position within the identified sub-set of haplotypes; and
- if a threshold criterion is met, assigning the most-frequently assigned marker variant to the marker position, wherein the threshold criterion is in particular a minimum marker variant count of the most frequently assigned marker variant and/or a minimum ratio of the marker variant count of the most frequently assigned marker variant to the number of haplotypes in the sub-set of haplotypes.

Hence, embodiments of the invention suggest performing marker imputation within haplotypes (corresponding 1:1 to individuals in the case of haploid organisms) selectively at marker positions within genomic sub-regions that correspond to a haplotype-block (a marker position may correspond to multiple haplotype-blocks in the case of overlapping haplotype-blocks) and selectively based on marker data of a sub-set of haplotypes comprising the one or more haplotype-block. For each marker position within this genomic sub-region, the most frequent marker variant assigned to this position in the currently processed sub-set of haplotypes is considered to represent the "correct" marker variant. This marker variant is identified selectively based on genomic data of the haplotypes of a sub-set of haplotypes comprising the one or more haplotype-blocks covering the genomic sub-region or marker position to be imputed, but based on marker data of other haplotypes not comprised in the sub-set of haplotypes. Depending on the embodiment, the most-frequent marker variant can be assigned to this marker position in all haplotypes of the sub-set, thereby potentially overwriting correctly called mutations, or can be assigned selectively to the marker position of haplotypes in which this marker position is a second marker position (e.g. has an ambiguous or absent marker assignment).

Using a threshold criterion may have the advantage that haplotype-block guided marker imputation is performed only in case a sufficiently large fraction of the marker variants assigned to a particular marker position in a sub-set of haplotypes indicate that this marker-variant is really comprised in the genome and is not a sequencing error. This ensures that in case at a given position there does not exist a marker variant that clearly outnumbers the other marker variants assigned to this position, the most frequent marker variant observed at a given position is not used to impute missing genomic markers. The risk of artificially introducing markers which are actually not comprised in the said genomic sub-region would be too high. In a further beneficial aspect, the most-frequently assigned marker variant can be determined easily and quickly, thereby providing a decision criterion for marker imputation that is suitable for use in a high-throughput environment. This embodiment may not rely on counts regarding the number of sequence reads for deciding whether to perform marker imputation for a matching genomic sub-region and hence may be used both for genomic sequencing and/or array data.

According to embodiments, each of the first marker positions has assigned one or more count-parameters. Each count-parameter representing a marker variant and having assigned a numerical value indicating the copy number of sequence reads comprising the marker variant represented by the counter parameter. The performing of the haplotype-block guided marker imputation comprises, for each of the haplotypes of the individuals, selecting the one or more genomic sub-regions in this haplotype whose start and stop coordinates correspond to the start and stop coordinates of one or more of the haplotype-blocks. For each of the one or more selected genomic sub-regions of the haplotype and for each first and/or second marker position lying within the selected genomic sub-region, the performing of the haplotype-block guided marker imputation comprises:
- identifying one or more of the haplotype-blocks comprised in this haplotype and whose start and stop coordinates delimit a genomic sub-region covering the marker position;
- identifying a sub-set of the haplotypes of the individuals, the haplotypes of the subset being haplotypes comprising the said one or more identified haplotype-blocks;
- computing an aggregated read count for each of the marker variants assigned to this position in all haplotypes in the sub-set by aggregating the numerical values of all count parameters representing the same marker variant;
- identifying the marker variant for which the highest aggregated read count was computed; and if a threshold criterion is met, assigning the marker variant supported by the highest read-count to the marker position in each of the identified genomic sub-regions of the sub-set of haplotypes, wherein the threshold criterion is in particular a minimum aggregated read count threshold and/or a minimum ratio of the highest aggregated read count to the total number of reads in the sub-set of haplotypes covering this marker position.

This embodiment may have the advantage that the number of sequence reads "supporting" the existence of a particular genomic marker at a given marker position is aggregated over all haplotypes comprising the currently processed haplotype-block. This may ensure that the information conveyed in each individual read is taken into account when determining the marker variant having been observed most frequently at a given position within the sub-set of haplotypes comprising the currently processed haplotype-block.

The expression "haplotype comprising a haplotype-block" as used herein means that a haplotype comprises a genomic sub-region and a corresponding sub-sequence of marker variants which correspond to and/or have been be successfully matched with the comparison marker variant sequence within the start and stop coordinates of a haplotype-block. Likewise, the expression "within genomic sub-regions (of a haplotype) whose start and stop coordinates correspond to the start and stop coordinates of one or more of the haplotype-blocks" as used herein means that a haplotype comprises a genomic sub-region and a corresponding sub-sequence of marker variants which can be or have already been successfully matched and aligned with the comparison marker variant sequence within the start and stop coordinates of a haplotype-block.

Depending on the nature of the haplotype-block library, the comparison marker positions in the haplotype-block library may basically be identical to the marker positions in the genomic marker data or may just comprise some marker positions which are identical to the marker positions in the genomic marker data and allow mapping and matching the haplotype-block and the haplotype with each other based on identical marker variants at corresponding marker positions. The haplotype-blocks and the haplotypes will have marker assignments at identical positions e.g. when the haplotype-block library has been created from genomic marker data obtained from the same individuals having provided the genomic marker data to be imputed. The haplotype-blocks and the haplotypes will have marker assignments at partly identical positions and partly different positions e.g. when the haplotype-block library has been created from individuals which are related but different from the individuals having provided the genomic marker data to be imputed.

Taking into consideration the threshold criterion may have the advantage that marker imputation at a given position is performed and missing or ambiguous marker assignments are replaced by an imputed marker only in case genomic markers with a minimum number of sequence reads aggregated at this position over the haplotypes in the sub-set are observed. This ensures that in case a sub-set of haplotypes comprising a haplotype-block has a position where only a very small number of sequence reads supports the presence of a particular genomic marker, no imputation is performed for this position. This reduces the risk of imputation errors. In a further beneficial aspect, information regarding the number of sequence reads at a given marker position is typically readily available in the sequence data provided by current sequencing machines.

For example, the genomic marker data can be received in the "Variant Calling Format" (.vcf).

In some embodiments, the threshold criterion used in the haplotype-count-based and/or the read-count-based embodiments may comprise one or more additional criteria, e.g. an criterion that the assignment is performed only in case the marker position in the currently processed haplotype is a second marker position, i.e., is a marker position having assigned an ambiguous marker assignment or no assignment at all. This may prevent overwriting a marker variant assigned to a first position which deviates from the marker variant observed most frequently at this position in the sub-set of haplotypes which represent a "real" mutation of a particular haplotype at this position rather than a sequencing or variant calling error.

According to embodiments, the step of "determining matches of the comparison marker variants of the haplotype-block and marker variants assigned to first marker positions in the haplotypes of the sub-set of the individuals" does not imply that only identical markers, e.g. identical SNPs are considered as "match". Rather, according to some embodiments, the marker comparison comprises computing a similarity score for the compared genomic markers, whereby the comparison is considered to represent a "match" if the similarity score exceeds a predefined threshold, e.g. 90% or 95% or 99%. For example, the markers may be probes of a microarray chip being oligonucleotides of about 100 nucleotides in length. Based on a similarity threshold of at least 99%, a first marker variant will be considered to "match" the comparison marker variant at least 99 of the 100 bases of the two compared variants are identical. According to other examples, the markers may be SNPs and a match represents identity of the respective single nucleotide.

According to some embodiments, the genomic marker data is received in the form of genomic sequencing data or array data with a plurality of marker positions many of which being already annotated and associated with respective marker variants. For example, the genomic marker data can be received from another computer responsible for performing a variant calling step on genomic raw data.

According to other embodiments, the method further comprises performing the variant-calling step. The method comprises:
   receiving genomic data of the genome of each of the individuals; For example, the genomic data can be received in the form of genomic raw data, i.e., genomic data provided by a sequencing apparatus or an array scanning apparatus; the genomic raw data is not annotated with marker variants;
   processing the genomic data for identifying marker variants at a plurality of marker positions in the genome of each individual, thereby assigning first ones of the marker positions to marker variants identified at the respective first marker positions, whereby for multiple second ones of the marker positions no marker variant is identified or an ambiguous marker variant assignment is made; and
   providing the processed genomic data comprising associations of marker positions and the respectively assigned marker variants as the genomic marker data.

In the above-mentioned method steps, a genomic marker data set can be created that is comparatively "raw" with a high rate of missing or ambiguous marker variant assignments. For example, existing standard read-mapping and variant calling software can be used to provide the genomic marker data of the multiple individuals. For example, software programs such as BWA-MEM (Li H. and Durbin R., 2009: "Fast and accurate short read alignment with Burrows-Wheeler Transform", Bioinformatics, 25:1754-60), and FreeBayes (Erik Garrison and Gabor Marth: "Haplotype-based variant detection from short-read sequencing" 2012, arXiv 1207.3907) can be used. Another program that can be used for providing the genomic marker data is GATK (McKenna A, Hanna M, Banks E, et al. "The Genome Analysis Toolkit: a MapReduce framework for analyzing next-generation DNA sequencing data", Genome Res. 2010). BWA-Mem is comprised in the software package BWA for mapping low-divergent sequences against a large reference genome, such as the human genome.

BWA-MEM is generally recommended for high-quality queries as it is considered fast and accurate. As the marker imputation to be performed will increase the quality of the data set, applicant has observed that BWA-MEM and similar programs may be used for obtaining the genomic marker data even though the genomic raw data may be low or ultra-low depth genomic data. The variant calling software is set to output variant counts (e.g. allele counts) at each call for providing the genomic marker data.

According to embodiments, the individuals are haploid or doubled haploid organisms or are a group of inbred organisms. In this case, each individual comprises a single haplotype. According to some embodiments, the processing of the genomic data for identifying the marker variants at the plurality of marker positions is preferably free of a phasing process. The phasing process refers to the process of statistical estimation of haplotypes from genotype data. For example, phasing may be required when genotypes are collected at a set of polymorphic sites from a group of diploid or polyploid individuals. The phasing process can be performed, for example, as described in Loh P R, Palamara P F, Price A L.: "Fast and accurate long-range phasing in a UK Biobank cohort", Nat Genet. 2016, 48(7):811-816.

For example, in human genetics, genome-wide association studies can be performed based on genotypes collected from thousands of individuals at between 200,000-5,000,000 SNPs using microarrays. Haplotype estimation methods ("phasing methods") are used in the analysis of these datasets and allow genotype imputation of alleles from reference databases such as the HapMap Project and the 1000 Genomes Project.

One of the limitations of imputation when working with genotyping data derived from low read depth sequencing, has been the challenge of phasing the reads, causing imputation error rates to increase notably.

In contrast to human and livestock genetics, where phasing is commonly performed, fully inbred and homozygous lines are readily produced in crop species like maize, wheat, barley and many other plant species. Such inbred lines are becoming more used in breeding to, among others, reduce breeding cycles, improve selection, protect plant variety, and safeguard genetic diversity. Applicant has observed that at least in fully inbred/homozygous lines phasing is not necessary and is omitted according to embodiments of the invention because the marker sequence on all homologous chromosomes is identical. As these organisms comprise genomes which do not require phasing, there is a high potential in using low-to-very low sequencing depth to genotype crops and apply efficient imputation to obtain maximum data quality without performing a phasing process and hence at minimal computational cost. Specifically, embodiments of the invention make use of information on read depth for computationally increasing the local genomic coverage and for imputing marker variant not yet having been called.

According to alternative embodiments, the individuals are diploid or polyploid organisms. In this case, the processing of the genomic data for identifying the marker variants at the plurality of marker positions preferably comprising performing a phasing process for providing two or more haplotypes for each of the individuals.

For example, read-based phasing can be used. Read-based phasing uses conventional whole genome sequencing (WGS) reads as input data to extract physical linkage information and then reconstructs haplotypes based on overlapping sequence fragments carrying two or more variant sites. A comparison of 11 different phasing approaches which may be applied is described in "Comparison of phasing strategies for whole human genomes", Yongwook Choi, et al., PLoS Genetics, 14.4 (2018).

According to embodiments, the method further comprises, for each of the individuals:
 performing a preliminary marker imputation based on the processed genomic data for imputing marker variants at a plurality of marker positions in the genome not having assigned a marker variant;
 supplementing the processed genomic marker data with the preliminarily imputed marker variants;
 using the supplemented processed genomic marker data as data basis for computing the haplotype-block library;

In the step of imputing the missing or ambiguous marker variants at the second marker positions based on the haplotype-block information ignores (i.e. does not consider) the preliminarily imputed marker variants. Hence, this additional, preliminary marker imputation step using conventional and less accurate means is performed for the sole purpose of providing the data basis to be used according to one embodiment for computing the haplotype-block library. For example, the computed preliminarily imputed marker variants can be computed using pre-existing imputation software e.g. Beagle (Browning B L, Zhou Y, Browning S R "A One-Penny Imputed Genome from Next-Generation Reference Panels" Am J Hum Genet. 2018 Sep. 6; 103(3):338-348). This step may increase the quality of the haplotype-block library, and hence the accuracy of haplotype-block-guided marker imputation, but is optional.

According to embodiments, the multiple individuals are selected from a group comprising:
 individuals with a haploid genome;
 individuals with a doubled-haploid genome;
 individuals of an inbred species, race or variety;
 individuals with a diploid genome;
 individuals with a polyploid genome;
 wherein the individuals preferably are plants or animals or humans.

According to embodiments, the prediction of the feature is selected from a group comprising:
 genotyping at least one of the multiple individuals, in particular for
  identification of individuals with particular traits, and/or
  for breeding or research, in particular identifying individuals for use in a breeding project;
 performing genome-wide association-studies (GWAs).

For example, both the imputed marker variants and optionally also the haplotype-block library can then be used in genetics applications, including genome wide association studies (GWAs) and genomic prediction (GP), for predicting the presence of one or more features in the multiple individuals or their offspring or for identifying associations of genomic marker variants with various traits.

According to embodiments, the genomic marker data is based on (e.g. is derived from) genomic data of the genomes of the multiple individuals, whereby the genomic data is selected from a group comprising:
 deep sequencing data of the individuals, wherein deep sequencing data has a coverage of at least 10-fold;
 ultra-high-depth sequencing data of the individuals, wherein ultra-high-depth sequencing data has a coverage of at least 100-fold;
 DNA array data, in particular SNP array data, of the individuals.

Embodiments of the invention may be applied on expensive array-based and/or deep sequencing based genomic data. However, embodiments may likewise be applied on cheap low-quality/low coverage genomic data and provide similar results in terms of feature prediction accuracy. Hence, the same approach can flexibly be used for performing the marker-based imputation both for low-depth and for high-depth genomic data.

According to embodiments, the genomic marker data is based on genomic data of the genomes of the individuals, whereby the genomic data is selected from a group comprising:
 low-depth sequencing data of the individuals, wherein low-depth sequencing data has a coverage of less than 10; or
 ultra-low-depth sequencing data of the individuals, wherein ultra-low-depth sequencing data has a coverage of less than 1-fold.

Although the quality of the genomic data may be poor, embodiments of the invention may allow for significantly increasing the quality of the genomic data and allow the use of low-depth sequencing data as a basis for further data analysis. Applicant has observed that the proposed haplotype-block-library-based imputation of the genomic marker variants increases the data quality to a sufficient degree as to support the abovementioned analyses.

According to embodiments, the genomic markers are single nucleotide polymorphisms (SNP) or different alleles. However, also other types of genomic markers can be used.

According to embodiments, the method comprises using the imputed marker variants together with already annotated marker variants for identifying structural genomic variants (SV), in particular copy-number variants (CNV) such as deletions or multiplications.

According to embodiments, the method further comprises, for each haplotype of a sub-set of haplotypes comprising one of the haplotype-blocks, and for each of the marker positions or local region comprised in this haplotype:

Determining an observed local read-depth at the marker position or local region, whereby the marker variants imputed in the haplotype-block-guided marker imputation respectively represent a read;

Determining an average local read depth at the marker position or local region as an average of the corresponding marker position or local region of all haplotypes of the sub-set;

Identifying a ratio of the observed local read-depth and the average local read depth at the marker position or local region;

If the ratio is below a minimum threshold or above a maximum threshold, identifying a structural marker variant at this position, wherein the structural marker variant is in particular a copy-number variant (CNV)

Applicant has observed that in particular for the detection of structural variation the haplotype-block based guided imputation may be highly useful: the approach is highly efficient, as the accuracy of feature predictions based on imputed genomic marker data having an original read depth of only 0.5× data was very similar to 30× data that was generated for other examined plant lines. This indicates that embodiments of the invention enable the calling of structural variation from as low as 0.5× depth per line. In other studies, applicant has observed that detecting structural variation typically needs 5-10× read depth. Hence, the method of haplotype-block guided marker imputation according to embodiments of the invention may allow for a significant cost reduction, enabling the calling of structural variation on large scale populations.

For example, the haplotype-block library can be computed using existing software programs such as HaploBlocker (Pook, T., Schlather, M., de los Campos, G., Mayer, M., Schoen, C. C., & Simianer, H.: "HaploBlocker: Creation of subgroup-specific haplotype-blocks and libraries", 2019, Genetics, 212(4), 1045-1061). For each chromosome of the analyzed genomes, HaploBlocker computes a haplotype-block library containing group-wise identity-by-descent (IBD) haplotype-blocks is obtained. However, other programs for computing haplotype-block libraries can be used alternatively. Depending on the embodiment, the analysis of the several chromosomes can be ran serially or in parallel.

According to embodiments, the providing of the haplotype-block library comprises:

providing haplotype-block identification source data (HIS data); the HIS data are the genomic data of a plurality of haplotype-block identification source individuals (HIS individuals, i.e., individuals whose genomic data is used for obtaining the haplotype-block library);

i. according to some embodiments, the plurality of HIS individuals comprises all or at least some of the individuals whose feature is to be predicted and wherein the HIS data is the genomic data to be imputed;

ii. according to other embodiments, the plurality of HIS individuals comprises all or at least some of the individuals whose feature is to be predicted; the HIS data is genomic data obtained through a genomic determination method such as, for example, DNA array or whole genome sequencing, which is different from the genomic determination method used for obtaining the received genomic marker data of the multiple individuals;

iii. according to other embodiments, the plurality of HIS individuals from whom the HIS data is derived do not comprise the individuals whose feature is to be predicted; rather, the HIS individuals comprise individuals which are (genetically) related to these individuals; the HIS individuals can in particular comprise individuals being genetically related to the individuals whose feature is to be predicted; the HIS individuals can in particular be individuals belonging to the same phylogenetic taxon, e.g. the same species or sub-species (e.g. variety, line or race) as the individuals whose feature is to be predicted;

applying a haplotype-block-identification software on the HIS data for identifying a plurality of haplotype-blocks; and providing the identified plurality of haplotype-blocks as the haplotype-block library.

For the generation of the haplotype library, we will refer to the input genotype matrix, its individuals and variant positions as matrix-input, individuals-in-input and positions-in-input, respectively.

For example, according to option a), the haplotype-block library can be generated using a genomic marker matrix which is the marker matrix to be imputed. The genomic marker matrix whose markers are to be imputed is in addition used for computing the haplotype-block library, whereby the multiple individuals from which the matrix is derived can be a sub-set of or can be identical to the set of HIS individuals.

For example, according to option b), the multiple individuals from which the matrix is derived can be a sub-set of or can be identical to the set of HIS individuals. While the set of individuals used for providing the genomic marker data and for providing the HIS data may be identical or strongly overlapping, the genomic marker data originates from another genotyping method or experimental approach than the HIS data, e.g. from comparative genomics using a set of genome assemblies or genotyping-by-array. For example, the HIS individuals may be genotyped using a genotyping array for providing the HIS data while the genomic marker data to be imputed can be derived from low-depth sequencing data. A pre-requisite for option b) is that there is some overlap between the "comparison marker positions" in the HIS data and variant positions in the genomic marker data at least in individuals whose markers are to be imputed which are not used as HIS individuals.

For example, according to option c), the set of individuals whose genomic marker data is to be imputed can comprise a different yet related set of individuals than the set of HIS individuals. The HIS individuals may for example belong to another related line serving as reference panel genotyped with either high-depth sequencing or array. The HIS data can be produced using one or several different genotyping methods or experimental approaches such as genotyping-by-sequencing, comparative genomics of genome assemblies, or genotyping-by-array. There should be some overlap between the "comparison marker positions" in the HIS data and variant positions in the genomic marker data to be imputed. In this case, the genomic sub-regions from the individuals having provided the genomic marker data ("individuals to be imputed") need to be matched with the haplotype-blocks in the library. That is, for each haplotype-block in the library, between the start and stop coordinates of the blocks, comparison marker variants are extracted from the haplotype-block and in addition marker variants are extracted from the same interval for the genomic data of the "individuals to be imputed". Variants that overlap between the two sets are selected to conduct a similarity analysis. Matches with the highest overall similarity or above a pre-determined threshold are selected if found. From the start to end of each matching haplotype-block, the individual-to-be-imputed is assigned as carrying the selected haplotype-block if found.

As there exist many different options of how to provide the HIS data, the provision of the haplotype-block library is greatly facilitated. In particular, it is possible to use genomic data of the individuals to be imputed which is identical to the genomic marker data to be imputed or which may have been obtained with different technique, e.g. in the context of a different genomic prediction or analysis. It is even possible to use genomic data of related individuals as the HIS data. Any one of the above-mentioned approaches a)-c) will ensure that the comparison markers and respective comparison marker positions in the genome in the HIS individuals are identical or at least similar to the genomic markers and respective marker positions in the genomes of the individuals-to-be-imputed.

According to embodiments, the HIS data consists of phased genomic data and the haplotype-block library comprises comparison marker variant sequences having been obtained based on phased genomic data.

According to embodiments, the HIS data consists of phased genomic data, the haplotype-block library comprises comparison marker variant sequences having been obtained based on phased genomic data, the multiple individuals are diploid or polyploid organisms and the genomic marker data used for imputing the marker variants is unphased data.

This may have the advantage that the marker imputation and the subsequent feature prediction can be performed on genomic marker data of unphased diploid or polyploid individuals if the haplotype-block library itself contains phased data. This may reduce processing load and increase performance, because the phasing is performed implicitly during the alignment of the phased haplotype-blocks and the haplotypes. Hence, no extra phasing process of the genomic data is necessary.

According to embodiments, each haplotype-block of the library is compared with genome data of the HIS individuals (or HIS haplotypes) for identifying the individuals (or haplotypes) which were found to share the haplotype-block sequence. It is assumed that all individuals belonging to a haplotype-block specific subset carry identical or near identical nucleotide sequences and marker sequences in their genome.

Several alternative approaches for generating the library can be used (and used for preparing the HIS data according to any one of the options a), b) or c)). According to some embodiments, the HIS data is genomic sequencing data comprising marker positions (referred herein as "comparison marker positions") associated with marker variants ("comparison marker variant"). According to other embodiments, the HIS data is DNA array data, in particular SNP array data or structural variant (SV) data.

This may ease the generation of the HIS data as it may be possible to use existing genomic data provided in the context of a different experiment or breeding project with the same or related individuals.

According to embodiments, the genomic marker data and/or the supplemented processed genomic marker data mentioned are provided in the form of a matrix of individuals and genomic positions of the individuals. Each cell of the matrix is indicative of the marker variant identified at the genomic position in the genome of the individual identified by the matrix coordinates of the matrix cell. Each cell optionally comprises one or more numerical values respectively indicating the number of sequence reads being indicative of the presence of a particular marker variant at the genomic marker position.

Using a genomic marker matrix may have the advantage that this data format can easily and efficiently be processed by various existing software programs for haplotype-block detection. A matrix format can be interpreted easily both by humans and by software programs.

According to embodiments, the predicted feature is selected from a group comprising:
  a breeding value;
  a likelihood of comprising a favorable trait;
  an indication that the individual has the highest likelihood of comprising an undesired trait;
  a likelihood of comprising a favorable combination of two or more traits and/or an indication of the favorable combination;
  a likelihood of comprising an undesired combination of two or more traits and/or an indication of the undesired combination;
  the likelihood of occurrence of a favorable or of an undesired trait in an offspring of two of the individuals;
  the likelihood of a genomic marker variant of being associated with one or more traits of the individuals. For example, the association can be an observed correlation of one or more genomic marker variants with one or more traits of interest, e.g. an observed correlation identified by performing a GWA on the imputed genomic marker variants.

In a further aspect, the invention relates to an alternative computer-implemented method for predicting a genome-related feature from genomic marker data of multiple individuals. The method comprises:
  receiving genomic data of each of the individuals, the multiple individuals comprising one haplotype or multiple haplotypes respectively;
  computing a haplotype-block library comprising a plurality of haplotype-blocks, each haplotype-block comprising start and stop coordinates and a series of marker positions referred to as 'comparison marker positions' lying within the start and stop coordinates; For example, the identification of haplotype blocks and of comparison marker positions can be performed based on an initial variant calling step which identifies comparison markers by comparing the genomic data of the individuals with a reference genome and by identifying the haplotype-blocks based on the markers identified in the initial marker calling operation; however, the haplotype-blocks may likewise be identified based on sequence-alignment techniques. For example, alignments could be based on Tag-SNPs from a founder population, or be based on genotyping by sequencing—GBS);

performing a haplotype-block-guided marker imputation (which may also be referred to as "haplotype-block-guided variant calling") of marker variants selectively within genomic sub-regions of the haplotypes whose start and stop coordinates correspond to the start and stop coordinates of one or more of the haplotype-blocks, whereby the imputation (or "haplotype-block-guided variant calling") comprises:

aligning genomic sub-regions of sub-sets of the haplotypes comprising the same haplotype-block with each other, whereby the begin and end of the aligned sub-regions corresponds to the start and stop coordinates of the shared haplotype-block, and applying a variant calling software on the aligned genomic sub-regions, whereby the variant calling software uses the aligned sub-regions of each sub-set of haplotypes as reads obtained for this sub-region; this step may also be referred to as "haplotype-block-guided variant calling";

supplementing the genomic data of the multiple individuals by assigning the imputed (or "haplotype-block-guided variant called") marker variants to respective marker positions; and using the supplemented genomic marker data for computationally predicting the feature of the individuals.

According to embodiments, the performing of the haplotype-block guided marker imputation comprises, for each of the haplotypes of the individuals:

selecting the one or more genomic sub-regions in this haplotype whose start and stop coordinates correspond to the start and stop coordinates of one or more of the haplotype-blocks;

for each of the one or more selected genomic sub-regions of the haplotype:

identifying a sub-set of the haplotypes, the haplotypes in the said sub-set sharing at corresponding sub-regions one or more of the haplotype-blocks with each other;

aligning the sub-region of the haplotype with the corresponding sub-region of the other haplotypes in the subset;

performing a marker variant calling step on the aligned sub-regions for calling marker variants in the sub-region of the haplotype, whereby the sequence information in the aligned sub-regions of the other haplotypes of the sub-set are used as reads.

Most of the concrete examples disclosed herein will be described with reference to the first mentioned approach where a variant calling step for providing the genomic marker data is applied before the haplotype-block guided marker imputation step is performed. The above mentioned alternative approach performs the marker calling and marker imputation step in a single, unified approach: the marker calling software can be, for example, a conventional marker calling software such as FreeBayes. Conventional variant calling software programs are able to evaluate multiple reads obtained for a single haplotype (individual) by comparing the reads with a reference genome. The alternative approach treats the aligned genomic sub-sequences which are selected and aligned base on a shared haplotype block (or based on parts of two or more overlapping haplotype blocks) as if they were different reads of the same individual (or haplotype) although they have been derived from different individuals (or haplotypes). Hence, when a marker is called according to the alternative approach for a sub-region of a currently processed haplotype, all aligned sub-regions of the other haplotypes of the subset are treated as if they were additional reads obtained in a single sequencing approach for a single individuum, thereby computationally increasing the number of reads/the data basis that can be used for marker identification/imputation.

The calling software according to some embodiments is configured to identify markers in each of the sequences provided as input (i.e., the aligned genomic sub-regions of sub-sets of the haplotypes comprising the same haplotype-block with each other, whereby the begin and end of the aligned sub-regions corresponds to the start and stop coordinates of the shared haplotype-block) by comparing each input sequence against a reference genome. Then, the called markers of all aligned sequences are evaluated in order to identify markers at respective marker positions in the sequence alignment. For example, if a given marker in the reference genome was identified in the majority of aligned sequences, the marker is "called" or "imputed" at this marker position. In other embodiments, the calling software makes use of comparison markers and comparison marker positions which may have already been obtained during the computation of the haplotype-block library (e.g. by making use of a conventional variant calling software and a reference genome). In this case, the variant calling steps merely comprises an evaluation of the already called markers in the aligned sequences (comparison markers) in order to identify markers at respective marker positions in the sequence alignment. This step is not only a variant calling, but also a marker imputation step, because in case at a given position the sub-sequence of individual X lacks a particular marker M while the vast majority of the aligned sub-sequences of the other individuals show this marker M, this marker is "imputed" to be present at this position also for individual X.

As the alignment is based on sub-sequences corresponding to and matching one or more of the haplotype-blocks of the library, the alternative approach for marker imputation is also a haplotype-block guided marker imputation. This approach could likewise be called haplotype-block guided marker prediction" or "haplotype-block guided marker calling", because the method treats genomic regions of different organisms which represent the same haplotype block as reads for performing a conventional marker calling operation using a reference genome. Hence, the two alternative approaches described herein may have a different order of steps but share the common concept of using information comprised in a haplotype-library for identifying subsets of haplotypes and sub-sets of aligned sub-regions of the said haplotypes for providing an information-rich data basis used for imputing missing markers or for calling/computationally identifying marker variants at first hand.

Embodiments and aspects described herein with reference to the genomic-marker data-based approach likewise apply to and can be combined with the alternative approach as long as they are not mutually exclusive.

According to embodiments, the invention relates to a method for conducting a plant or animal breeding project, the method comprising:

providing a group of candidate plant or animal individuals, wherein a candidate individual is an individual potentially to be used in the breeding project;

performing the method according to anyone of the embodiments described herein for computationally predicting a feature of the candidate individuals, the feature being indicative of the breeding value of the individuals or their offspring;

selecting and using the ones of the candidate individuals as parent individuals in the breeding project whose predicted breeding value is the highest.

In a further aspect, the invention relates to a computer-system, in particular a computer system configured for predicting a genome-related feature from genomic marker data of multiple individuals, the computer system comprising:
one or more processors;
a volatile or non-volatile storage medium comprising instructions which, when executed by the one or more processors, cause the processors to perform a method as described herein for embodiments of the invention.

For example, the instructions can be provided in the form of a single application program or a set of two or more application programs. The computer system can be a single monolithic computer system or can be a distributed computer system, e.g. a cloud system.

In a further aspect, the invention relates to a digital storage medium, a software program or a computer program product comprising computer-interpretable instructions which, when executed by a processor, cause the processor to perform a method for predicting a genome-related feature from genomic marker data of multiple individuals as described herein for embodiments of the invention.

The term "phasing" (also known as "haplotype estimation") refers to the process of statistical estimation of haplotypes from genotype data. Phasing in diploid or polyploid organisms is the process of determining the sequence of genomic markers in one out of n homologous chromosomes comprising different marker variants (e.g. alleles), wherein n is an integer larger 1.

The term "haplotype", also referred to as "haplotype phase" or "haploid genotype", refers to a combination of sequences and markers that are linked along a chromosome. In population genetics, haplotypes are used to represent strongly correlated genotypes at adjacent sites in linkage. Each haplotype corresponds to a unique segment of an ancestral chromosome and serves as a specific marker for ancestral and demographic inference. The relation of "individuals" to "haplotype" is 1:1 in inbred lines like doubled haploid lines. In diploid material, there are two "haplotypes" per individual. In general, the term haplotype refers to the phased genotype, but the "haplotype" as used herein shall not be interpreted such that phasing is a mandatory step for all embodiments. For example, applicant has observed that for inbred lines or haplotype lines and in some cases even for di- or polyploid lines, no explicit phasing step is required for providing the genomic marker data as the phasing may be performed implicitly when aligning the haplotypes to phased haplotype-blocks. Genotype in general refers to the number of times a base pair is there on the (in diploid lines: two) copies of the chromosome. Haplotype then splits the (two) chromosomes copies into separate DNA segments.

A "haplotype-block" as used herein is data comprising at least the start and stop coordinates of the haplotype-block within a genome and comprises an in-between sequence of comparison marker variants having been observed in the genomic sequence comprised within the start and end coordinates). In particular, a "haplotype-block" can indicate start and stop coordinates of a sub-region of an organism's genome in which there is little evidence of a history of genetic recombination, whereby in this genomic sub-region in a plurality of different individuals only a small number of distinct sub-sequences ("haplotype-blocks") has been observed. Sometimes, but not in this application, the "haplotype-blocks" are misleadingly also referred to as "haplotypes" although "haplotype-blocks" do not represent a whole haploid genome or a whole phased genotype but rather represents a particular DNA sub-sequence associated with a particular genomic sub-region.

In particular, a haplotype-block can comprise a marker position series comprising the total amount of positions between the start and the stop coordinates where a marker potentially could be called. For example, if the markers are SNPs, each nucleotide position can be a position where a marker can potentially be called, but typically at most nucleotide positions only a single marker variant is known. If the markers are alleles, every gene could be a position where a marker can potentially be called, but typically for many genes only a single marker variant is known.

For example, a haplotype-block library may have known/reported comparison marker variants at positions {1;3;5} but the haplotype-block in effect comprises a sequence of all positions {1;2;3;4;5} where potentially a comparison marker can be observed, whereby in this example positions 2 and 4 may be imputed subsequently despite having no known/reported variants in the genomic sequence data that supports the haplotype-block.

The term "haplotype-block library" as used herein is a collection of haplotype-blocks. According to embodiments, haplotype-blocks can overlap. The haplotype library may comprise multiple haplotype-blocks having the same start and end coordinates but having different comparison marker sequences in-between and/or comprise multiple haplotype-blocks having different start and/or end coordinates and different (non-overlapping and/or overlapping) comparison marker sequences.

The term "genome-related feature" as used herein is any observable or measurable property (trait) of an organism which can be predicted as a function of one or more genomic marker variants.

A "genomic marker" or "marker" as used herein is a gene or DNA sequence or single nucleotide with a known location on a chromosome that can be used to genotype individuals or species. It can be described as a variation (which may arise due to mutation or alteration in the genomic loci) that can be observed. A genomic marker may be a short DNA sequence, such as a sequence surrounding a single base-pair change (single nucleotide polymorphism, SNP), or a long one, like minisatellites. Some commonly used types of genetic markers are: RFLP (or Restriction fragment length polymorphism), SSLP (or Simple sequence length polymorphism), AFLP (or Amplified fragment length polymorphism), RAPD (or Random amplification of polymorphic DNA), VNTR (or Variable number tandem repeat), SSR Microsatellite polymorphism, (or Simple sequence repeat), SNP (or Single nucleotide polymorphism), STR (or Short tandem repeat), SFP (or Single feature polymorphism), DArT (or Diversity Arrays Technology), RAD markers (or Restriction site associated DNA markers), or a structural genomic variant (SV), including presence-absence variant, copy-number variant (CNV), and/or inversion. According to preferred embodiments, the marker is a single nucleotide polymorphism (SNP), an allele of a gene, or a structural genomic variant (SV), or a combination of two or more different marker types.

The term "marker position" as used herein is a position within a genomic sequence where a genomic marker was identified or is expected to be identifiable. Depending on the types of markers used (e.g. SNPs, alleles, etc.), the positions can be a position of a single nucleotide or a locus of a nucleotide sequence, e.g. a locus of an allele. The "first marker positions" comprise marker variants which were successfully called in an initial calling step. The second marker positions have either no marker assigned (the call failed) or have ambiguous assignments (e.g. 1 "hit" for the first allele and 1 "hit" for the alternative allele although there can only exist one allele at a given position. According to embodiments, a marker position is a position in the genome of an organism that corresponds to a known marker position in a reference genome.

The term "comparison marker" as used herein is a genomic marker contained in a haplotype-block of the haplotype-block library.

The term "comparison marker position" as used herein is a genomic marker position in a haplotype-block of the haplotype-block library where one or more genomic marker variants were observed.

The term "variant calling" as used herein is the process by which marker variants are identified in genomic data at respective marker positions.

The term "genomic data" as used herein is a broad term referring to sequenced DNA that can be in the form of raw data derived from sequencing, an organism's genome in whole or in part (whole assembled genome sequences or whole exome sequences—the genes that encode proteins), or individual DNA variations. Genomic data (e.g. array data or sequencing data) may or may not have assigned marker variants.

The term "genomic marker data" as used herein is genomic data (e.g. array data or sequencing data) having assigned marker variants at respective marker positions.

The term "imputing" as used herein relates to the prediction of missing (or ambiguously identified) genomic marker variants.

A "genome-wide association study" (GWA study, or GWAS), also known as whole genome association study (WGA study, or WGAS), as used herein is an observational study of a genome-wide set of marker variants in different individuals to see if any marker variant is associated with a trait. A trait can be, for example, a phenotypic, metabolic, genotypic, behavioral trait of an organism or any other form of property of the organism that can be observed or measured.

The term "coverage" (or "depth") of sequencing data refers to the number of unique reads that include a given nucleotide in the reconstructed sequence. Deep sequencing refers to the general concept of aiming for high number of unique reads of each region of a sequence. Even though the sequencing accuracy for each individual nucleotide is very high, the very large number of nucleotides in the genome means that if an individual genome is only sequenced once, there will be a significant number of sequencing errors. Furthermore, many positions in a genome contain rare single-nucleotide polymorphisms (SNPs). Hence to distinguish between sequencing errors and true SNPs, it is necessary to increase the sequencing accuracy even further by sequencing individual genomes a large number of times.

The term "low-depth sequencing data" as used herein refers to sequencing data having a low coverage, in particular a coverage of less than 10-fold.

The term "ultra-low-depth sequencing data" as used herein refers to sequencing data having a very low coverage, in particular a coverage of less than 1-fold.

The term "deep sequencing data" as used herein refers to sequencing data having a coverage of at least 10-fold.

The term "ultra-deep sequencing data" (or "ultra-high-depth sequencing data" as used herein refers to sequencing data having a very high coverage (at least 100-fold). Ultra-deep sequencing data may allow for detection of sequence variants in mixed populations. In the extreme, error-corrected sequencing approaches such as Maximum-Depth Sequencing can make it so that coverage of a given region approaches the throughput of a sequencing machine, allowing coverages of $>10^8$.

A "read" or "sequence read" as used herein is a DNA fragment obtained in a genome wide sequencing approach that gets sequenced and then is typically either aligned to a reference genome or assembled. In NGS methods, a whole genome, or targeted regions of the genome, is randomly sheared into small fragments (or short reads) that get sequenced and are then either aligned to a reference genome or assembled.

The term "HIS data" (haplotype-block identification source data) as used herein refers to genomic data that is processed in order to identify haplotype-blocks. The HIS data is the genomic data of a plurality of haplotype-block identification source individuals (referred herein as "HIS individuals").

A "reference genome" is typically a frequently used line which is well studied and has a well-known marker sequences. To the contrary, the "comparison marker positions" and "comparison marker variants" in the haplotype-block libraries are preferably identified in HIS-individuals which are identical to or related to the individuals whose marker variants are to be imputed. Hence, the genomic HIS data comprising "comparison marker positions" and "comparison marker variants" are preferably provided in a per-case basis and should not be confused with the "reference genomes" used by some of the programs used for identifying and mapping marker positions during the identification of the haplotype-blocks of the library.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments, computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

BRIEF DESCRIPTION OF THE DRAWINGS

In the following, only exemplary forms of the invention are explained in more detail, whereby reference is made to the drawings in which they are contained. They show:

FIGS. 9A/B illustrate the haplotype-block library guided marker imputation step in greater detail;

FIGS. 10A/B illustrate a haplotype-block library based guided imputation step for structural marker variants;

FIG. 10B the effect of the marker imputation on the markers in an individual matrix row;

DETAILED DESCRIPTION

Figure 1A:
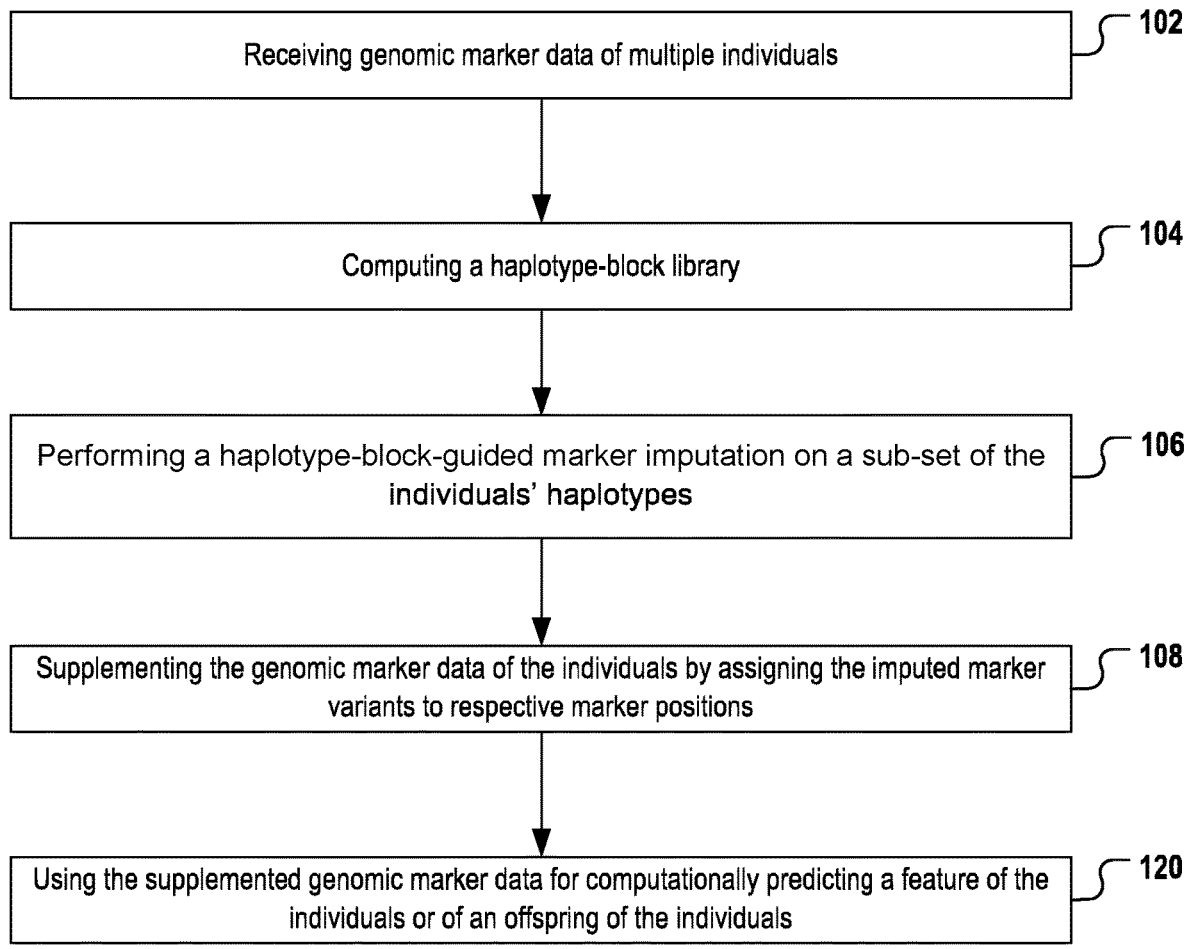
FIG. 1A a flowchart of a method according to a first alternative for imputing genomic marker data.

FIG. 1A shows a flow chart of an example of a computer-implemented method for predicting a genome-related feature 458 from genomic marker data of multiple individuals 402. The method can be implemented by one or more software programs in the following referred to as "software" together providing for a marker-imputation-and-feature-prediction workflow framework.

In a first step 102, the software receives genomic marker data 434 of each of a plurality of individuals, e.g. low-depth sequencing data of a population of 321 double-haploid (DH) lines derived from the maize landrace Petkuser Ferdinand Rot.

For example, the genomic marker data can be read from a computer-readable storage medium. The read genomic marker data may have been provided in a pre-processing step by standard read-mapping and variant calling software (bwa mem and FreeBayes) used to generate a "raw" SNP-dataset with high rate of missed and ambiguous calls. Standard software such as bwa mem and FreeBayes, or alternatively GATK may be used. The variant calling software is set to count and output marker variant counts at each call (marker position) for downstream use.

Optionally, in particular if the received genomic marker data is in addition to be used as HIS data for computing the haplotype-block library, the received genomic marker data can be a preliminarily imputed genomic marker dataset using pre-existing imputation software e.g. Beagle. However, these preliminarily imputed markers are only used for generating the haplotype-block library.

The received genomic marker data comprises first marker positions respectively having assigned marker variant 1140-1142 which has been unambiguously identified at this first marker position. The genomic marker data further comprises multiple second 1144 marker positions which do not have a marker variant assigned or have an ambiguous marker variant assignment (to two or more different marker variants).

In step 104, the software computes a haplotype-block library 448 comprising a plurality of haplotype-blocks 1126-1136. Each haplotype-block comprises a series of marker positions referred to as 'comparison marker positions'. Each comparison marker position has assigned a marker variant referred to as 'comparison marker variant' 1122, 1124. For example, the haplotype-block library can be calculated using the software HaploBlocker (Pook T, Schlather M, de los Campos G, Mayer M, Schoen C C, Simianer H (2019) HaploBlocker: Creation of subgroup specific haplotype-blocks and libraries. Genetics) with either (1) the received genomic marker data ("HB-seq"); or (2) array data of the same individuals (or clones/genetic copies) ("HB-array"); or (3) sequencing data or array data of other individuals which are genetically related to the individuals whose genomic marker data is to be imputed, wherein the genomic data can be obtained e.g. with either high-depth sequencing or array technology. According to embodiments, the haplotype-block library is generated with the sole aim of being used for marker imputation. This is a different purpose than reported in the respective publications related to existing haplotype-block identification software programs such as HaploBlocker.

Next in step 106, the software identifies, for each of the haplotype-blocks, a sub-set of the multiple individuals' haplotypes comprising the haplotype-block.

For example, the identification of the sub-set of haplotypes comprising a given haplotype-block may be performed by HaploBlocker or by another program able to align the sequence data and/or marker variant data of haplotypes with the sequence data and/or comparison marker data of the haplotype-blocks and to determine whether the haplotype comprises a sub-region with a sufficient degree of similarity with the DNA sequence or comparison marker sequence to determine that the sub-region of the haplotype "matches" the haplotype-block and hence the haplotype "comprises" the haplotype-block. Different approaches for identifying the sub-set of haplotypes comprising a currently processed haplotype-block can be used:

In the simplest case, the genomic marker data of the multiple individuals is also used for computing the haplotype-block library. In this case, the start and stop coordinates of the haplotype-blocks and the genomic coordinates of the genomic marker data of the haplotypes of the multiple individuals are based on the same genomic coordinate system and the haplotype-blocks may have assigned identifiers of the haplotypes from whom they were derived. In this case, the start and stop coordinates and the identifiers of the haplotypes (individuals) can directly be used for identifying the sub-set of individuals comprising a currently processed haplotype-block.

In other embodiments, different but genetically related individuals may have been used for computing the haplotype-block library. In this case, not every comparison marker position of a haplotype-block may correspond to a respective first or second marker position in a haplotype although there will be some corresponding marker positions thanks to the above-mentioned genetic relationship. In this case, a matching process is performed, e.g. a nucleotide-sequence or marker-variant-sequence based alignment and matching process for identifying sub-regions in a haplotype having a sufficient degree of similarity with the genomic sequence or the comparison marker sequence of a haplotype-block to be identified as a "matching" haplotype comprising the haplotype-block. For example, the currently examined haplotype-block may comprise 100 comparison marker positions having assigned a sequence of 100 comparison marker variants. A similarity threshold of the matching process may be set to "at least 99%". Any haplotype comprising a sub-sequence of at least 99 marker variants being identical to the sequence of the 100 comparison marker variants will be considered a "matching" haplotype "comprising" the haplotype-block. The sub-set of the totality of haplotypes of the multiple individuals which comprise the currently processed haplotype-block and the marker-variants assigned to the matching sub-regions of the haplotypes of this sub-set will provide the data basis for the following haplotype-block guided marker imputation step.

The sub-regions of all haplotypes of the sub-set corresponding to the genomic sequence represented by the haplotype-block are aligned. For example, in case a currently examined haplotype-block comprises 130 comparison-marker positions observed within a continuous genomic sequence of 30.000 bp sequence limited by the start and stop coordinates of the haplotype-block, and in case 50 haplotypes were identified to comprise this haplotype, each of the 50 aligned sub-regions may also comprise 130 marker positions which correspond to the 130 comparison marker positions and which may or may not have assigned a marker variant. In case the haplotype-block library was computed based on genomic data of other individuals, not all comparison marker positions may correspond to the marker positions of the haplotypes and vice versa. For example, the above-mentioned haplotype-block comprising 130 comparison-marker positions observed within a continuous genomic sequence of 30.000 bp sequence may have been successfully matched with the 50 haplotypes identified to comprise this haplotype, but each of the 50 aligned sub-regions may comprise 150 rather than 130 marker positions whereby only 110 of these 150 marker positions are identical to one of the 130 comparison marker positions.

So, for each of the 130 (or 150) marker positions in the above-mentioned two alternative examples, the marker-variant-related information of 50 haplotypes has to be evaluated. It is possible that at a given marker position, a haplotype may not have a marker assignment (miss), may have an ambiguous marker assignment (sequence reads supporting more than one marker variant) or have an (unambiguous) marker assignment.

Then, a software configured for haplotype-block-guided marker imputation identifies, for each of the (130 or 150) marker positions, one or more of the haplotype-blocks covering this marker position and identifies a sub-set of the haplotypes respectively comprising one of the one or more haplotype-blocks. Then, all marker variants assigned to this position in all the (50) haplotypes of the sub-set and identifies the most-frequent haplotype variant assigned to this position. In some embodiments, this step simply comprises counting the number of haplotypes in the sub-set which have assigned a particular marker type to this position, so in this case, the count obtained for the most frequent marker variant will typically not exceed the number of haplotypes in the sub-set (50). In other embodiments, this step simply comprises counting the number of reads obtained for all haplotypes in the sub-set which support the presence of a particular marker type at this position, so in this case, the count obtained for the maximum number of reads supporting a particular marker variant at a given position may exceed the number of haplotypes in the sub-set, because there may be zero, one or multiple reads per position per haplotype. Then, an additional threshold criterion in respect to the most frequently observed marker variant/the marker variant with the largest number of supporting reads is evaluated. The threshold criterion may require that the identified most frequent/best supported marker variant was observed at least in a predefined minimum number of haplotypes or is supported by at least a minimum number of reads. For example, the criterion may require that at least 3 haplotypes have to share a marker variant at a given position (this however is a flexible parameter and is recommend to be increased for datasets with high number of individuals).

If this criterion is fulfilled, the most frequent/best supported marker variant identified at the currently evaluated marker position is assigned to this marker position in all the (50) haplotypes comprised in the subset or is assigned only to this marker position in the ones of the (50) haplotypes which have an ambiguous or missing marker assignment at this marker position.

In some embodiments, combined "reliability" scores are computed for the marker variants observed at a given marker positions as a function of both the number of haplotypes in the sub-set comprising this marker variant and of the number of reads supporting the marker variant.

Genomic marker calls that were missing and were only imputed in an optional preliminary marker imputation step for computing the haplotype-block library are ignored in step 106, meaning that marker positions having assigned these preliminarily imputed marker variants are considered to be "second marker positions" with missing marker information.

Next in step 108, the software supplements the genomic marker data of the multiple individuals received in step 102 by assigning the imputed marker variants to respective ones of the second marker positions.

Finally, in step 120, the software uses the supplemented genomic marker data 454 for computationally predicting the feature 458 of the individuals. Often, step 120 requires additional external data on the individuals, whereby the additional external data is of the same nature as what is being predicted. In most cases, this would be phenotypic data, e.g. growth rate, stress-resistance, etc.

In a further, optional step (not shown), a copy-number-variation (CNV) calling can be performed in order to identify structural variants. The identification of structural variants is based on identifying deviations of the observed number of reads at a given marker position (i.e., the observed sequencing depth at this marker position) from the expected number of reads (expected local sequencing depth) given the coverage of the sequencing method used for providing the genomic data. The method preferably takes into account confidence intervals extracted from the theoretical distribution of sequence reads. If the difference of the observed to the expected number of reads exceeds a threshold, the respective haplotype or individual is considered to comprise a structural marker variant at a given position, e.g. a deletion or multiplication of a gene, a SNP or other type of marker. According to embodiments, a deletion is called when read-depth falls less than 4 times lower than the expected read depth. The expected read depth can be computed as the product of read lines with the read depth: when reads of 30 lines with a read-depth of 0.5× are locally merged, a read-depth of 15× is expected. A duplication is called when the read depth is at least twice as high as expectation. Deletions and duplications are then coded as binary marker variants, e.g. "DEL" and "MULT".

Optionally, the imputed genomic marker data obtained in step 108 may be input to traditional marker imputation software such as Beagle in order to identify additional markers and/or call markers which may still be missing after step 108. This "multi-fold" imputed genomic marker data may be used as input in step 120.

Evaluation of the Haplotype-Block Guided Marker Imputation

Evaluation 1: Read Depth Increase

The imputation pipeline described above was applied on a dataset of 321 maize DH lines derived from the open-pollinated landrace Petkuser. The DHs were whole-genome sequenced at 0.5× read-depth to obtain the raw data 404. Freebayes was run with forcing calls on known high-quality polymorphisms from the 600 k Affymetrix® Axiom Maize Genotyping Array (Unterseer, S., Bauer, E., Haberer, G. et al. A powerful tool for genome analysis in maize: development and evaluation of the high density 600 k SNP genotyping array. BMC Genomics 15, 823 (2014). https://doi.org/10.1186/1471-2164-15-823) to provide genomic marker data 434 of each of a plurality of individuals of the DH lines. The imputation pipeline in step 102 receives the above-mentioned low-depth genomic marker data of the population.

The haplotype-block library was computed based on two alternative approaches: in one test approach referred to as "HB-seq", sequencing data of the above-mentioned maize lines was used for computing the haplotype-block library. In an alternative test approach referred to as "HB-array", array data was obtained from the maize lines using 600 k Affymetrix® Axiom Maize Genotyping Array and was used as HIS data for computing the haplotype-block library.

Then, the genomic marker data 434 was imputed in the HB-seq approach using the haplotype-library derived from the sequencing data. In addition, the genomic marker data 434 was imputed in the HB-array approach using the haplotype-library derived from the array data.

The imputation efficiency and accuracy of the above-mentioned marker imputation pipeline and the suitability of the resulting data in downstream applications including genome wide association studies (GWAs) and genomic prediction (GP) was evaluated in respect to imputation efficiency and accuracy.

When using the HB-seq pipeline, the average read-depth increased from 0.53× to 83× (the totality of originally called and an imputed marker variants are considered "reads" at a given position, whereby the imputed marker variants represent computationally imputed "reads"). As a result, share of marker variants of the genotype dataset matrix 434 that were called increases from 39.3% before the haplotype-block guided marker imputation to 90.0% after haplotype-block guided imputation. It was observed that the read-depth varied greatly between lines and genomic sub-regions, as it depends primarily on the number of haplotypes (here: maize lines) comprising a haplotype-block.

When using HB-array an average read-depth of 51.3× and calls for 89.9% were obtained.

According to embodiments, the number of called marker variants depends on additional filters and thresholds which may be set to filter out wrong or ambiguous calls in order to increase accuracy.

The imputed marker data obtained in steps 102-108 based on the "HB-seq" and "HB-array" approaches were compared to marker data imputed via the software BEAGLE and also the impact of the optional additional BEAGLE-based marker imputation in addition to the HB-guided marker imputation was assessed.

Evaluation 2: Discordance Rates of the Imputed Sequence Data and Array Data for Different Imputation Algorithms When comparing discordance rates (the share of missing or ambiguous marker variant assignment) of the imputed SNP marker dataset with the genotype data from the 600 k Affymetrix® Axiom Maize Genotyping Array (Unterseer. 2014), error rates overall are reduced from 1.03% to 0.60% in the HB-seq pipeline and 0.50% in the HB-array pipeline was observed as illustrated in the table below. It should be noted that error rates here refer to discordance rates between the respective imputed panel and the 600 k data. As can be inferred from the table 1, both the HB-array guided marker imputation and the HB-seq guided marker imputation are more efficient and accurate than Beagle 5.0 marker imputation software for genomic array data. A BEAGLE-based marker imputation in addition to the HB-guided marker imputation may further reduce the number of missing or ambiguous calls.

The table 1 below shows discordance rates of the imputed sequence data and the 600 k Affymetrix® Axiom Maize Genotyping Array for different imputation methods.

| Discordance rates | HB-array guided marker imputation (present invention) | HB-seq guided marker imputation (present invention) | BEAGLE5.0 Pipeline (traditional marker imputation approach) |
|---|---|---|---|
| Overall | 0.50% | 0.60% | 1.03% |
| KL1: Markers present in raw data | 0.18% | 0.19% | 0.29% |
| KL2: With additional variant call after haplotype-block-guided marker imputation | 0.10% | 0.17% | 0.83% |
| KL3: Without additional variant call after haplotype-block-based imputation | 5.53% | 8.88% | 9.39% |

The table 1 above comprises three classes of marker data:
KL1: Positions/marker variants first called in the FreeBayes step (preliminarily imputed markers, raw-SNP dataset)
KL2: Positions/marker variants first called in the haplotype-block guided ("HBimpute") marker imputation step 108;
KL3: Positions/marker variants first called in an optional additional marker imputation step ("Beagle imputation step") performed in addition to step 108.

For all three classes substantial improvements in calling accuracy are obtained with the highest gains for those positions that were first called in the HBimpute step (KL2), as average error rates are reduced from 0.83% to 0.17%/0.10% in the HB-seq/HB-array approach. Similarly, discordance rates for positions already called in the FreeBayes step (KL1) are reduced by about 40% as calls are overwritten when a high number of other individuals in the same block carry the other variant, thus indicating the power of the HBimpute-approach to detect calling errors. In the example presented here, the genomic marker dataset imputed in the HB-array approach was compared to the same array data that was used for the calculation of the haplotype-block library and therefore is potentially downward biased. As similar improvements were observed when comparing the imputed data panel to high read depth sequence data this effect should be negligible. Due to the overall higher data quality and low share of missing markers after the HBimpute step, even error rates for positions imputed in the subsequent BEAGLE imputation step are reduced substantially. After the HBimpute step 90% of all variants are called. This is a tremendous increase in calling rate and accuracy. In case a full dataset is required, this can be obtained by subsequently applying conventional marker imputation software such as BEAGLE.

Without the final imputation step of KL3, some missed marker positions will remain. Their share can be different based on the approach. The HB-array approach in general has more gaps than HB-seq approach. A part of the reason why HB-array is performing better here is actually that more high-quality variants are included.

Evaluation 3: Discordance Rates of the Imputed Sequence Data and High Read Depth Data for Different Imputation Algorithms In a further test, discordance rates of imputed sequence data obtained using the haplotype-block guided marker imputation approach (HB-seq and HB-array) and using a conventionally imputed marker set using BEAGLE based on 30× sequence data that were obtained for seven of the individuals used for computing the haplotype-block library. Again, much better results based on the haplotype-block guided imputation (HB-seq: 1.01%/HB-array: 0.87%) compared to the dataset imputed via BEAGLE (1.65%) were obtained (see table 2 below). In contrast to the comparison to the array data, error rates for positions called in the HBimpute step are even lower than for markers called in the FreeBayes step, as overwriting of already called variants requires stronger evidence than calling a previously missing variant. Note that even though overall error rates when comparing to the high read depth sequence data seem to be high, this is mostly due to called variants being in less conserved regions. When just considering marker positions that are also on the array, error rates reduce to 0.90% for HB-seq, 0.68% for HB-array and 1.38% for plain BEAGLE imputation. Positions with no called variant in the 30× sequence data were ignored here.

TABLE 2

Discordance rates of the imputed sequence data and the high read depth sequence data for different imputations algorithms. In this second comparison, both methods HB-array and HB-seq are more efficient and accurate than BEAGLE 5.0.

| Discordance rates | HB-array guided marker imputation (present invention) | HB-seq guided marker imputation (present invention) | BEAGLE 5.0 Pipeline (traditional marker imputation approach) |
|---|---|---|---|
| Overall | 0.87% | 1.01% | 1.65% |
| Present in raw data | 0.28% | 0.31% | 0.56% |
| With call after HB | 0.08% | 0.21% | 1.07% |
| Without call after HB | 7.36% | 7.36% | 11.77% |

Estimation of Local Read-Depth and Structural Variation

Figure 14:
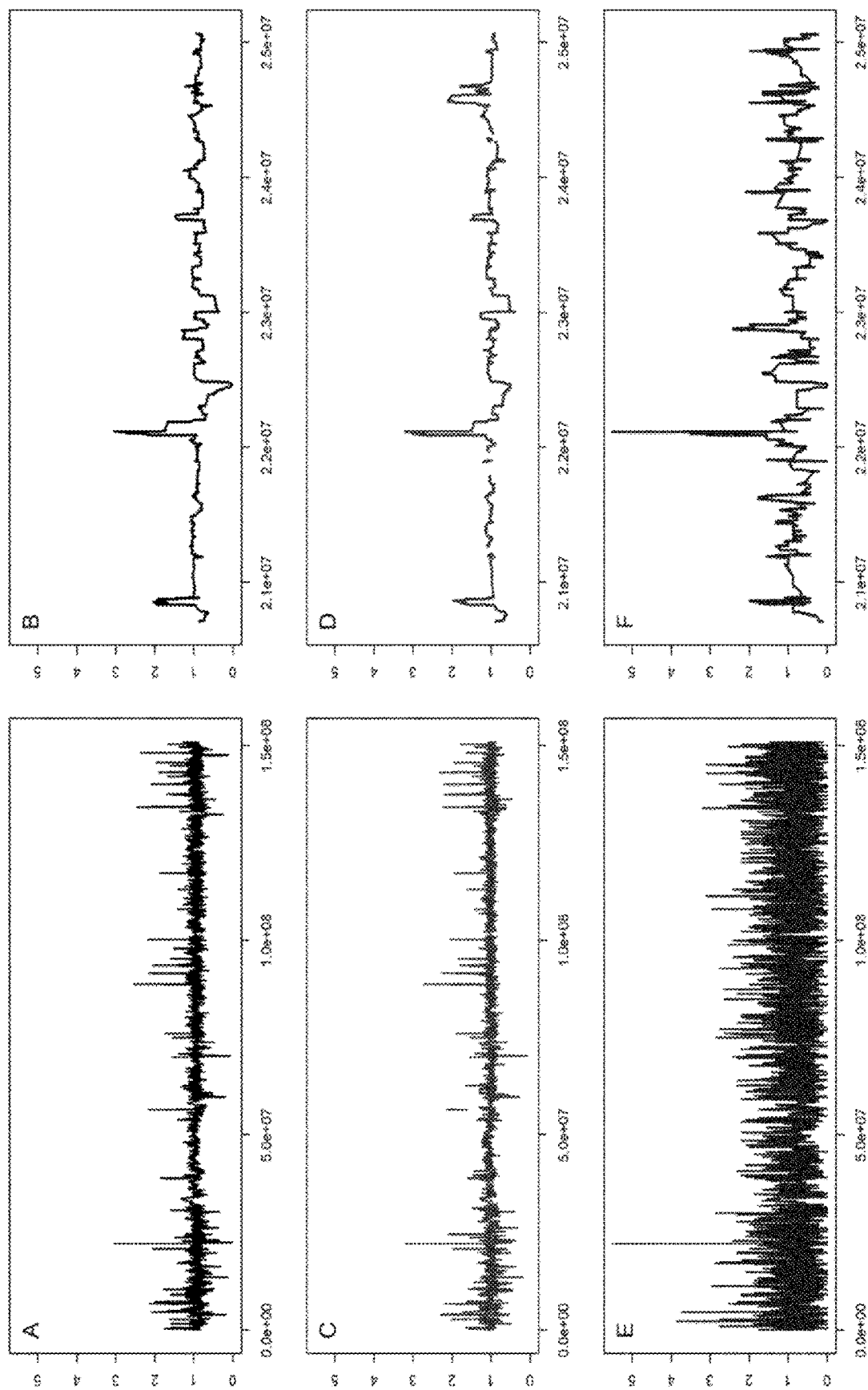
FIG. 14 plots of estimated read depth for a particular plant line via the use of different sequence data.

Genotyping of structural variants from read-mapping typically requires higher sequencing depth than calling SNPs. When comparing the obtained read-depth of the 30× sequence data to the imputed low sequence data, correlations of 0.808 were observed (compared to 0.257 for the raw 0.5× data), indicating that the imputed data can be used for the calling of structural variations. Visual inspection of local read depth also shows that peaks (FIG. 14A/C) and local pattern (FIG. 14 B/D) between the imputed low read depth sequence data and the high read depth sequence data match, whereas the raw low read depth sequence data has much higher volatility (FIG. 14 E/F). As the haplotype-block guided marker imputation only provides an estimated read depth for sub-regions that are in a haplotype-block of the library, some positions ("gaps", "misses") will not be imputed (4.1% in FIG. 14C).

Figure 13:
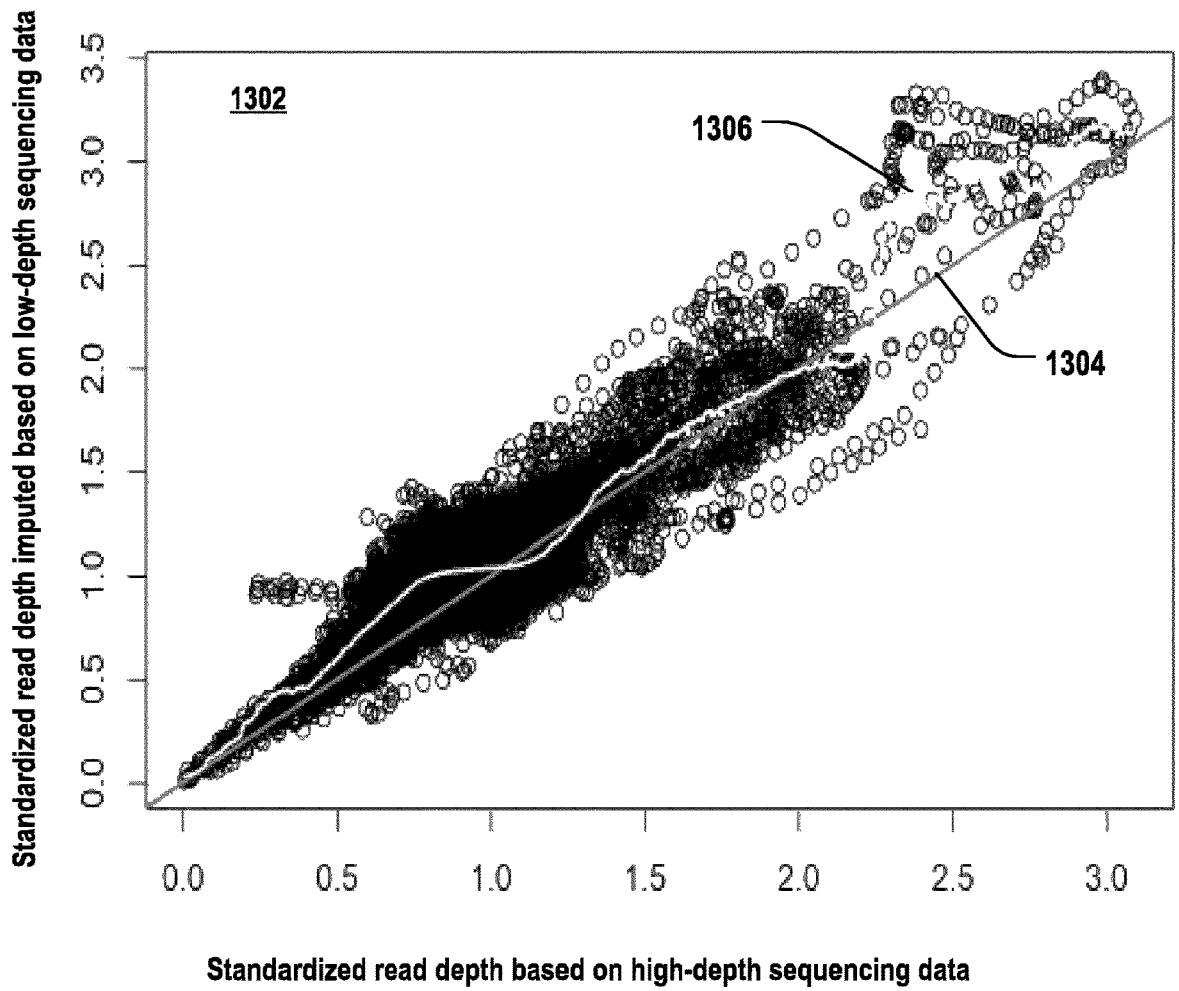
FIG. 13 estimated read depths for many different markers based pm low and high read depth sequence data.

For example, for 985 markers a read-depth of more than 45× was observed and 872 of those markers also had estimated and standardized read-depth of at least 1.5× (FIG. 13). Visual inspection shows that peaks (FIG. 14A/C) and local pattern (FIG. 14B/D) between the two imputed low read depth sequence data and the high read depth sequence data match.

Genomic Prediction

The performance of the haplotype-block guided marker imputation and Beagle-based marker imputation for genomic prediction was evaluated against that of the array data. We compared each set for its predictive ability for 9 traits (Hölker, A. C. et al. "European maize landraces made accessible for plant breeding and genome-based studies", Theor. Appl. Genet. 1-13 (2019)), including early vigor and plant height at different growing states, and days to silking. The predictive ability for the complete imputed sequence data panels was marginally lower for eight of the nine considered traits. Differences between models are small as the average difference was only 0.0026 and for no trait differences were higher than 0.0059 (see table 3 below). However, when using only the marker positions that the sequence and the array data share, differences are much smaller, with both HB-array and HB-seq statistically significantly outperforming the array data.

Including CNV calls identified via the haplotype-block-guided marker imputation did not improve the predictive ability in this evaluation. This again indicated that for genomic prediction a relatively small set of high-quality markers should already be sufficient to obtained accuracy breeding values but there may exist other situations where high-quality structural markers may be used and have an impact on genomic prediction.

The table 3 below shows the average prediction accuracy for the 9 maize phenotypes depending on the genotype data used. "CNV" refers to "copy-number-variant" calling.

| Pipeline | HB-array | HB-seq | BEAGLE 5.0 | HB-array + CNV | Array data |
|---|---|---|---|---|---|
| Prediction accuracy | 0.5104 | 0.5107 | 0.5104 | 0.5094 | 0.5131 |
| Prediction accuracy (only array markers | 0.5141 | 0.5144 | 0.5138 | 0.5133 | 0.5133 |

Genome Wide Association Study

In addition, the suitability of the imputed ultra-low read depth sequencing data to be used in GWAs was estimated and compared with GWAs results obtained based on high-density array data. The goal was to estimate whether the higher number of variants imputed from ultra-low-depth sequencing data compared to the array data impacted the power or resolution of GWAS. When comparing the Manhattan plots derived from sequence data and array data on simulated traits, in general higher peaks are observed for all variants of the sequence data, leading to a higher number of regions identified as statistically significant when using the same p-values. As the comparability between GWAS results for different datasets and same p-values and/or correction of significant threshold is not straight forward, the share of true positive QTL hits compared to the total number of hits was reported instead.

Figure 15:
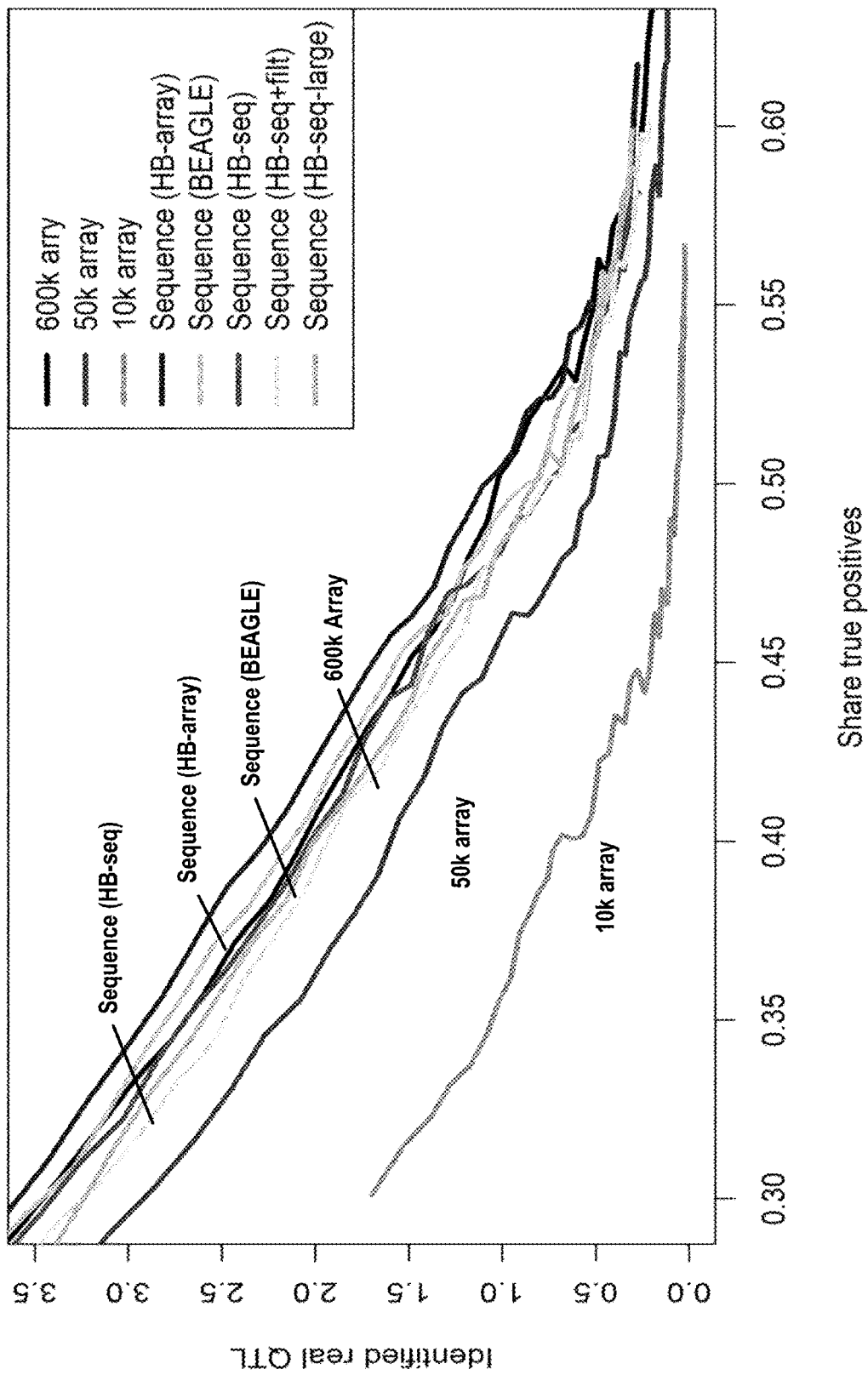
FIG. 15 shows a plot showing the performance of different imputed datasets.

Best results were obtained with sequence data imputed via HB-array and plain BEAGLE of the ultra-low read depth sequence data, closely followed by the 600 k array data and HB-seq (see FIG. 15). Even higher drops in performances were observed when using a genotyping array with 10 k/50 k markers. Overall, results for the different imputed low-read-depth sequence data panels are very similar and data panels with high number of markers in general seem most suitable for GWAS analysis.

In terms of mapping power, there were no clear differences between the approaches, as the average distance between peaks of QTL regions and the true underlying effect were similar in all approaches. For all sequence-based data panels, a relatively high number of isolated GWAs hits were observed that could potentially be due to transposable elements and other structural variation.

When comparing the share of true positive regions, compared to the total number of regions detected, still a higher power was observed for the sequence data with virtually no differences between the imputing approaches. When comparing the Manhattan plots derived based on sequence data and array data, in general higher peaks are observed for the sequence data. Significant regions are typically smaller, therefore indicating higher mapping power. This demonstrates the suitability and potential advantage of genomic marker data having been imputed based on a haplotype-block library as described herein for embodiments of the invention for genome-wide association mapping compared e.g. to high-density array data.

Overall, the data confirm that WGS and GBS data imputed via the haplotype-block library-guided marker imputation ("HBimpute") described herein for embodiments of the invention are valid alternatives to both low and high-density arrays in terms of genotyping accuracy and power. In particular, for the detection of structural variation the here suggested pipeline is shown highly efficient, as local read-depth of the imputed 0.5× data was very similar to 30× data that was generated for seven of the studied lines. This indicates that embodiments of the invention enable calling of structural variation from as low as 0.5× depth per line. In other studies, detecting structural variation typically needs 5-10×. Therefore, embodiments of the invention allow for a massive cost reduction and enable the calling of structural variation on large scale populations.

Figure 1B:
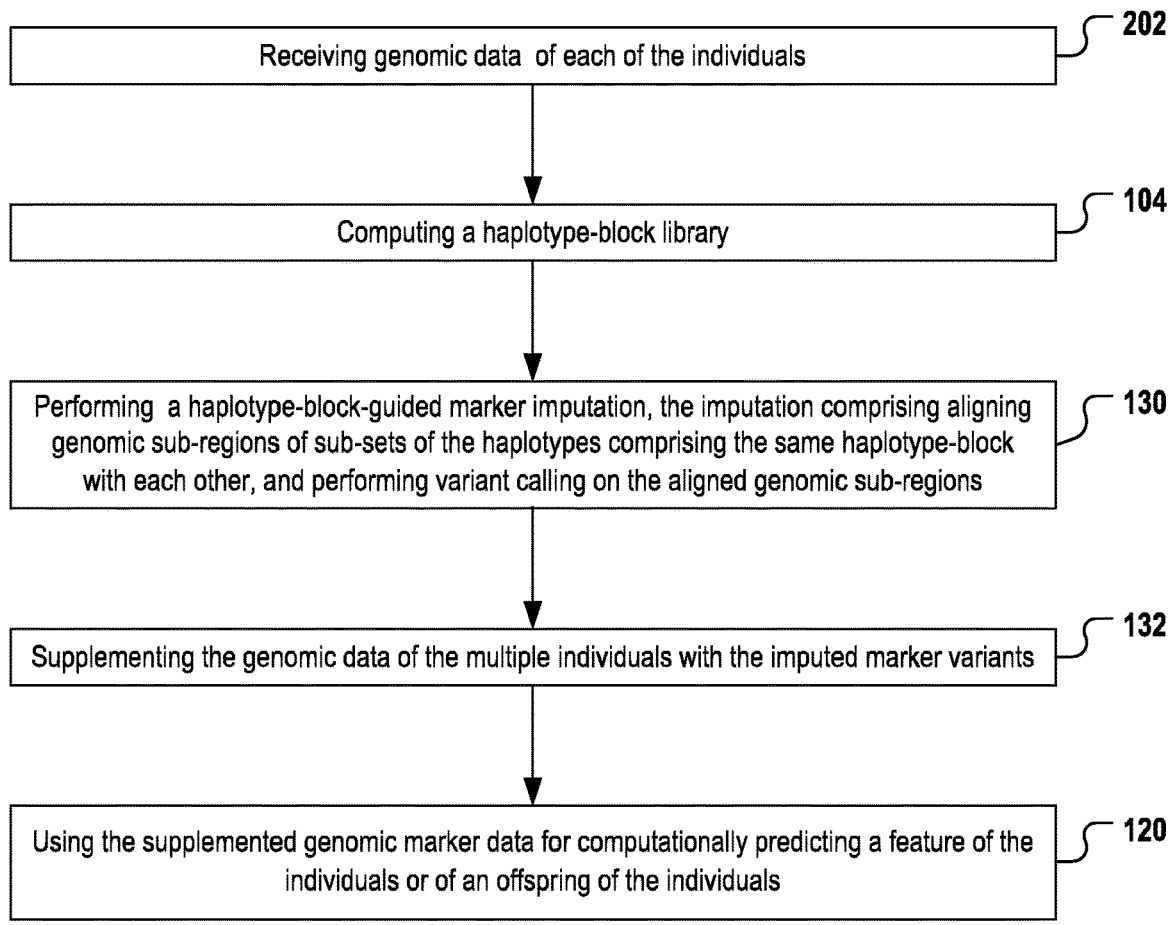
FIG. 1B a flowchart of a method according to a second alternative for imputing genomic marker data, FIG. 2 a flow chart of an initially performed variant-calling method.

FIG. 1B shows a flowchart of a computer-implemented method according to an alternative approach for predicting a genome-related feature 458 from genomic marker data of multiple individuals 402.

In a first step 202, genomic data 404 of each of the individuals is received. The multiple individuals comprise one haplotype or multiple haplotypes respectively. Contrary to the approach described in FIG. 1A (which may use genomic marker data that has undergone variant calling via a variant caller (e.g. FreeBayes/GATK etc.) and is using this output in the haplotype-block guided marker imputing step, the genomic data 404 received in this step does not comprise genomic marker annotations. For example, the data 404 can be a reads dataset obtained from a sequencing machine. The data 404 can be provided, for example, aligned as a bam-file.

Next in step 104, the haplotype-block library 448 is computed as described already with reference to FIG. 1A. Each haplotype-block comprises start and stop coordinates and a series of marker positions referred to as 'comparison marker positions' lying within the start and stop coordinates.

Next in step 130, a haplotype-block-guided marker imputation of marker variants is performed selectively within genomic sub-regions of the haplotypes whose start and stop coordinates correspond to the start and stop coordinates of one or more of the haplotype-blocks. The imputation comprises aligning genomic sub-regions of sub-sets of the haplotypes comprising the same haplotype-block with each other, whereby the start and end of the aligned sub-regions corresponds to the start and stop coordinates of the shared haplotype-block. The imputation further comprises applying a variant calling software on the aligned genomic sub-regions, whereby the variant calling software uses the aligned sub-regions of each sub-set of haplotypes as reads obtained for this sub-region. Hence, for each of the multiple individuals/haplotypes, the marker variant information comprised in the aligned sub-regions of the other individuals/haplotypes sharing the same haplotype-block are combined and used by the variant caller as "further reads" when the variant caller is applied on the genomic data (e.g. bam-files). This computationally increases the number of reads for the sub-regions in the haplotypes covered by a haplotype-block and hence represents not just a conventional marker calling step, but rather a combination of marker calling and marker imputation: the calling software is applied on a modified panel of raw sequencing data with reads from all locally matching individuals/haplotypes.

Next in step 132, the genomic data 404 is supplemented with the imputed marker variants by assigning these marker variants to respective marker positions in the respective haplotypes.

Finally, the supplemented genomic marker data is used for computationally predicting a feature of the individuals as described herein already for embodiments of the invention.

While the genomic-marker-based approach may have the advantage of being faster and less resource demanding, the alternative approach may have the benefit that the identification of structural variation in DH, inbred and/or haploid material may be facilitated, including also the identification of non-CNV structural variations such as inversion, insertions, translocations etc.

Figure 2:
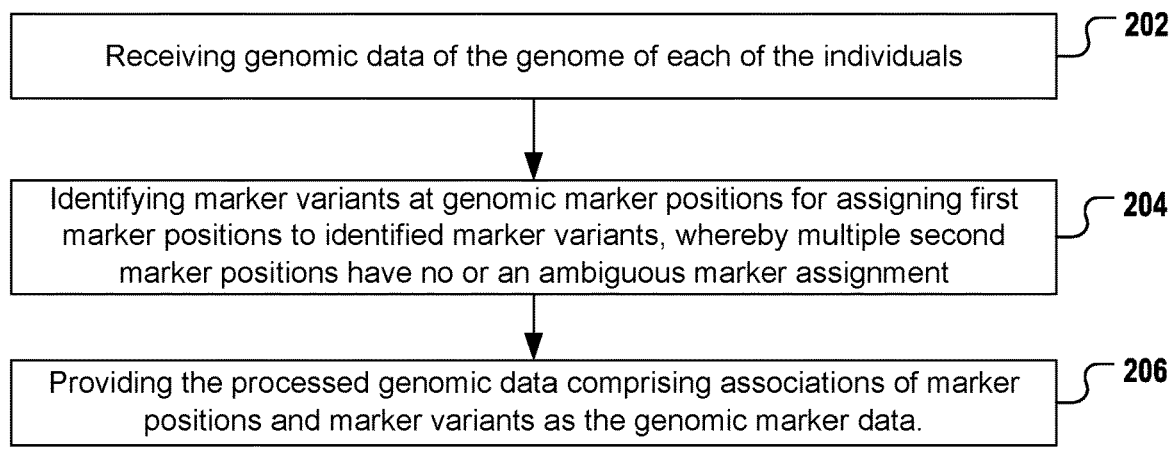

FIG. 2 shows a flow chart of a variant calling method that may initially be performed in order to provide the genomic marker data received in step 102. FIG. 2 will in the following described together with FIG. 5.

Initially, low-depth (LD) genomic sequencing data of the multiple individuals is obtained. For the sake of simplicity, the variant calling and further processing of this data is described for six individuals A, B, C, D, E and F of a (hypothetical) species having a single 20 bp chromosome. In practice, the number of individuals, the number of marker positions and the number of possible marker variants per position is much larger.

In a first step 202, low-depth sequence raw data 404 for the multiple different individuals is obtained. The sequencing raw data can be provided by a sequencer 502 and does not have assigned any marker information.

Next in step 204, a variant discovery software program such as bwa-mem and a variant calling software 418 such as FreeBayes are applied on the received raw data 404.

The output of this step is an assignment of sequence data with identified marker variants at respective marker positions in the genome. A preferred way to store the called marker variants is the Variant Calling Format (.vcf), the de facto standard format for such data. Vcf files can (and usually do) contain genomic data of multiple individuals.

The VCF format in general is very flexible and can be adapted based on the underlying species/reference genome used for initially calling the marker variants. However, the Vcf file format is only one out of many possible file formats and data formats that can be used to store and process genomic data of one or more individuals.

Typically, variant calling is performed based on known marker positions of a reference genome, whereby the same reference genome is used for all the multiple individuals. Using the same reference genome may ensure that the marker positions of the genomes of the multiple individuals correspond to each other and can be aligned and compared.

In case the individuals are diploid or polyploid organisms, a phasing step by state-of-the art phasing software 504 can be applied after the variant calling step 204 on the genomic marker data generated in this step 204. However, applicant has observed that the phasing step can be omitted even for diploid organisms if the haplotype-block library was obtained based on phased genomic data of the individuals A-F or genetically related individuals, because the phasing in this case can be performed implicitly when aligning the haplotypes (or sequence data to constitute the haplotypes) to the haplotype-blocks. The haplotype-block library may contain phased haplotype-blocks and matching the called variants to these haplotype-blocks essentially consists in phasing them.

The genomic marker data obtained in step 202 (which may in addition have been phased) can be provided in the form of a genomic marker matrix 434 to be imputed: genotyping-by-sequencing is conducted for identifying marker variants in the population of 6 haploid individuals A, B, C, D, E and F. In this genotyping-by-sequencing approach, the variant calling software has discovered and typed 10 variants with positions 1, 3, 6, 7, 10, 11, 14, 16, 19 and 20. The output of the pipeline is a genotype matrix 434 where the 6 individuals are represented e.g. by columns and the variant positions on the single chromosome are represented as rows. The intersections of individuals and positions report the variant calls and the allele counts for the first, e.g. reference, and alternative alleles at that position in parenthesis.

The existing variant calling software programs 418 typically use a reference genome 505 comprising two or more reference marker variants at each respective marker position and the calling process reports which one of two or more marker variants assigned to the respective position in the reference genome have been observed in the sequencing reads obtained for the respective individuals A-F.

For the sake of simplicity, the example described with reference to FIG. 5 assumes that at each marker position Pi, one out of only two marker variants $X_{Pi}$, $Y_{Pi}$ can be observed (whereby of course the two marker variants X, Y may be different at each position). The different marker variants $X_{Pi}$, $Y_{Pi}$ are indicated in the matrix 434 as binary digits "0" and "1". So the parenthesis (2;0) assigned to position P1 of D indicates that "marker variant $X_{P1}$" was observed at position P1 two times" and that "marker variant $Y_{P1}$" was not observed at position P1" in individual D. Hence, organism D has called marker variant $X_{P1}$ ("0") at position P1. Likewise, the parenthesis (0;3) assigned to position P1 of organism B indicates that "marker variant $X_{P1}$" was not observed at position P1" and that "marker variant $Y_{P1}$" was observed at this position P1 three times" in individual B (because three sequence read comprise and support the existence of this marker variant at this position. Hence, organism B has called marker variant $Y_{P1}$ ("1") at position P1). Likewise, the parenthesis (0;1) assigned to position P3 of organism E indicates that "marker variant $X_{P1}$" was not observed at position P3" and that "marker variant $Y_{P1}$" was observed at this position P3 one times" in individual E. Hence, organism E has called marker variant $Y_{P1}$ ("1") at position P3. Hence, P1 of B, P1 of D and P3 of E are "first marker positions", because they have (unambiguously) assigned a marker variant. To the contrary, P1 of A, P16 of C, P16 of E are "second marker positions", because in the initial calling step no marker variant could be identified. Positions without calls are shown as missing ("-"). Missing calls can consist of no counts of either first, e.g. reference, or alternative alleles "-(0;0)". Ambiguous calls comprise counts of either alleles e.g. "-(1;1)".

The marker positions P1 of C, P16 of D and P14 of F are also second marker positions, because they have an ambiguous assignment of a marker variant: at P1 of C, one instance (read) of marker variant $X_{P1}$ was observed and three instances (three reads) of marker variant $Y_{P1}$ were observed. Individual C has assigned marker variant $B_{P1}$ ("1") at position P1, because a majority of reads support this variant, but the assignment is ambiguous as there is also support for the other marker variant $X_{P1}$.

In some embodiments, for one or more of the marker positions in a haplotype, more than two marker variants are known. For example, at a marker position P34, the marker variant $X_{P34}$ may exist in a reference genome 505, and other marker variants $Y_{P34}$, $Z_{P34}$, may be observed in other genomes when comparing the genomic sequence or marker-IDs assigned to position P34 of the reference genome with other genomes/haplotypes. The different marker variants $X_{P34}$, $Y_{P34}$, $Z_{P34}$ may be indicated in the matrix as one of the three valid values "x" and "y" and "z" (not shown). So the parenthesis (2;0;0) assigned to position P34 of an organism indicates that in the sequencing data of this organism the "marker variant $X_{P34}$" (which is also comprised in the reference genome) was observed at position P34 two times", that "marker variant $Y_{P34}$" was not observed at this position P34" and that "marker variant $Z_{P34}$" was not observed at this position P34" in this individual. Hence, organism D has called marker variant XP1 ("x") at position P34: "x (2;0;0)".

Typically, the reference genome used in the calling step is a genome of a closely related line or species. The reference genome comprises a set marker sequences used as references and the called variants are deviations of genomic markers from reference markers at corresponding positions. So although during the calling step the "variants" are often identified as deviations from a reference marker at a given position, also the reference marker as used herein is a "marker variant".

Figure 5:
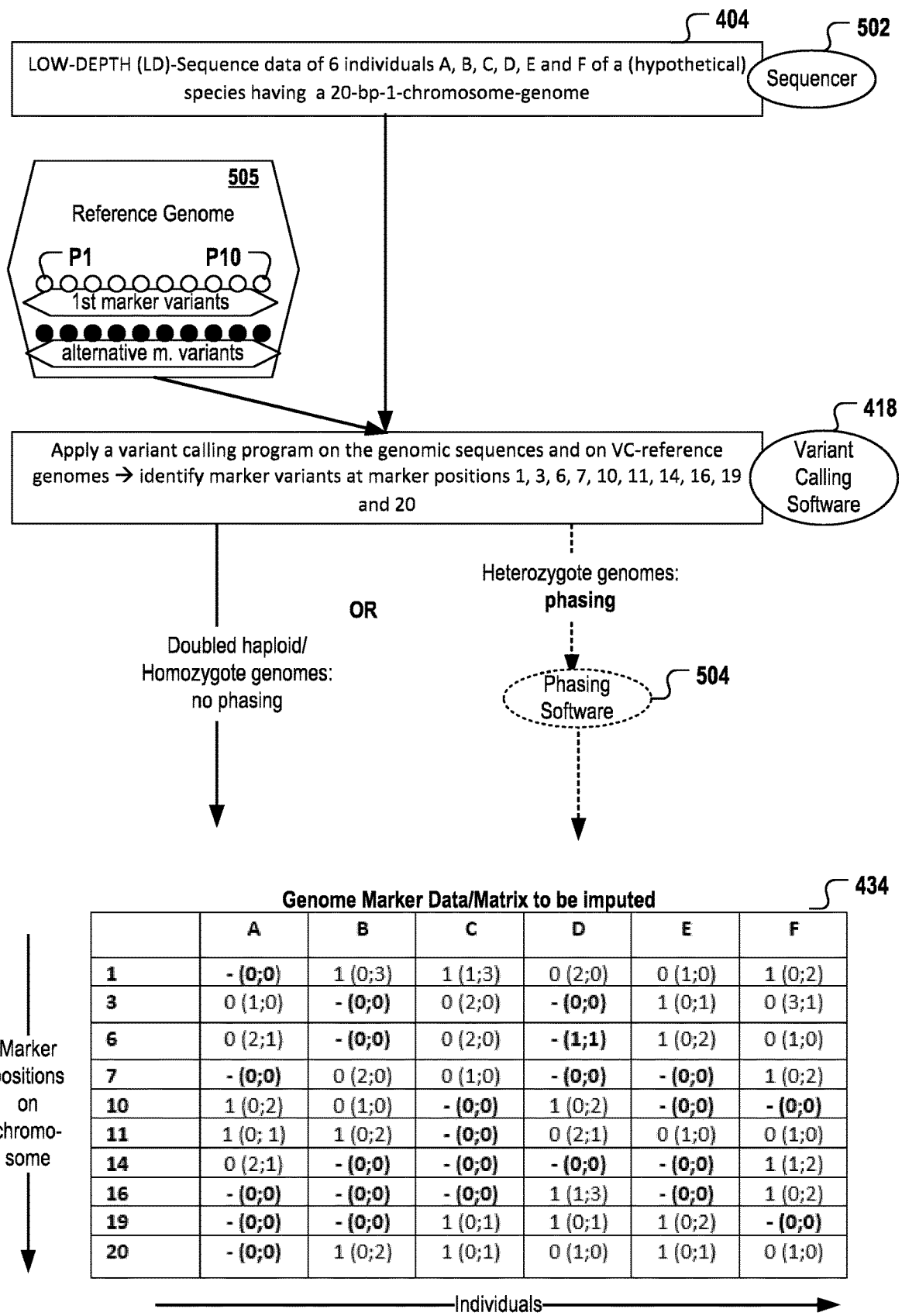
FIG. 5 a flow chart of a method for performing variant-calling for providing a marker matrix to be imputed.

So although the genomic marker matrix 434 of FIG. 5 depicts a case where all polymorphisms are bi-allelic, that is, variants take either the first allele, e.g. a reference allele shown as 0, or the single alternative allele (shown as 1), the marker imputation method likewise can be applied on polyallelic polymorphisms.

The genome marker data 434 is provided in step 206 as the genomic marker data that is received by a marker imputation program or pipeline in step 102.

Figure 3:
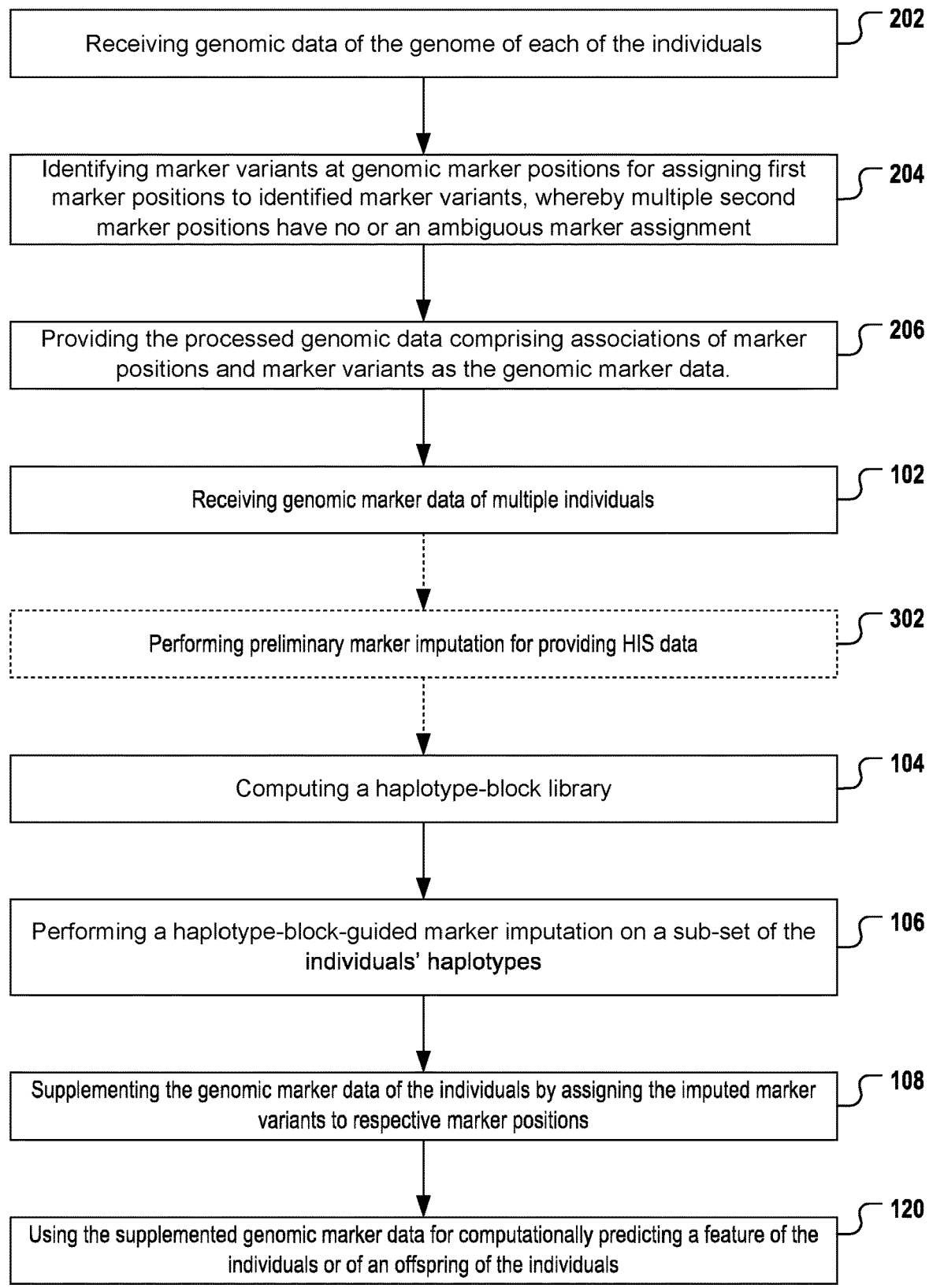
FIG. 3 a flow chart of a method for variant calling and marker imputation.

FIG. 3 depicts a flow chart of a method for processing low-depth sequencing raw data in a program pipeline comprising software for variant calling (steps 202-206) as described with reference to FIGS. 2 and 5 and comprising software for haplotype-block library guided marker imputation (steps 102-108) as described with reference for FIG. 1.

In an additional, optional step 302, a preliminary marker imputation is performed on the genomic marker data 434 using standard software such as Beagle. The preliminary marker imputation is performed solely for providing an improved genomic marker data set to be used as data basis (HIS data) for computationally identifying the haplotype-block library. The preliminarily imputed markers are ignored in the actual, haplotype-block library-guided marker imputation step 108.

HaploBlocker and other software programs for identifying haplotype-blocks can be applied on genomic sequencing data independent of the read depth. However, applicant has observed that performing a preliminary marker imputation step 302 using state of the art software such as Beagle may provide better/more accurate results because the number of marker positions to be considered is increased.

In general, the number of reads for a region are roughly distributed according to a Poisson distribution. Therefore, the probability to have no call is exp(-depth), e.g. 60% for 0.5×, 36% for 1× and 13.5% for 2×.

Hence, performing the additional step 302 may be particularly advantageous in case the genomic data is sequencing data with a depth of less than 2×, because in this case the preliminary marker imputation may significantly increase the number of marker positions to be considered during the identification of the haplotype-blocks of the haplotype-block library.

In step 120, the supplemented ("imputed") genomic marker data output in step 108 is used as basis for predicting a feature of the one or more individuals or of an offspring of the individuals. For example, step 120 can comprise performing a GWA for identifying marker variants which correlate with a particular phenotypic trait of interest.

Figure 4:
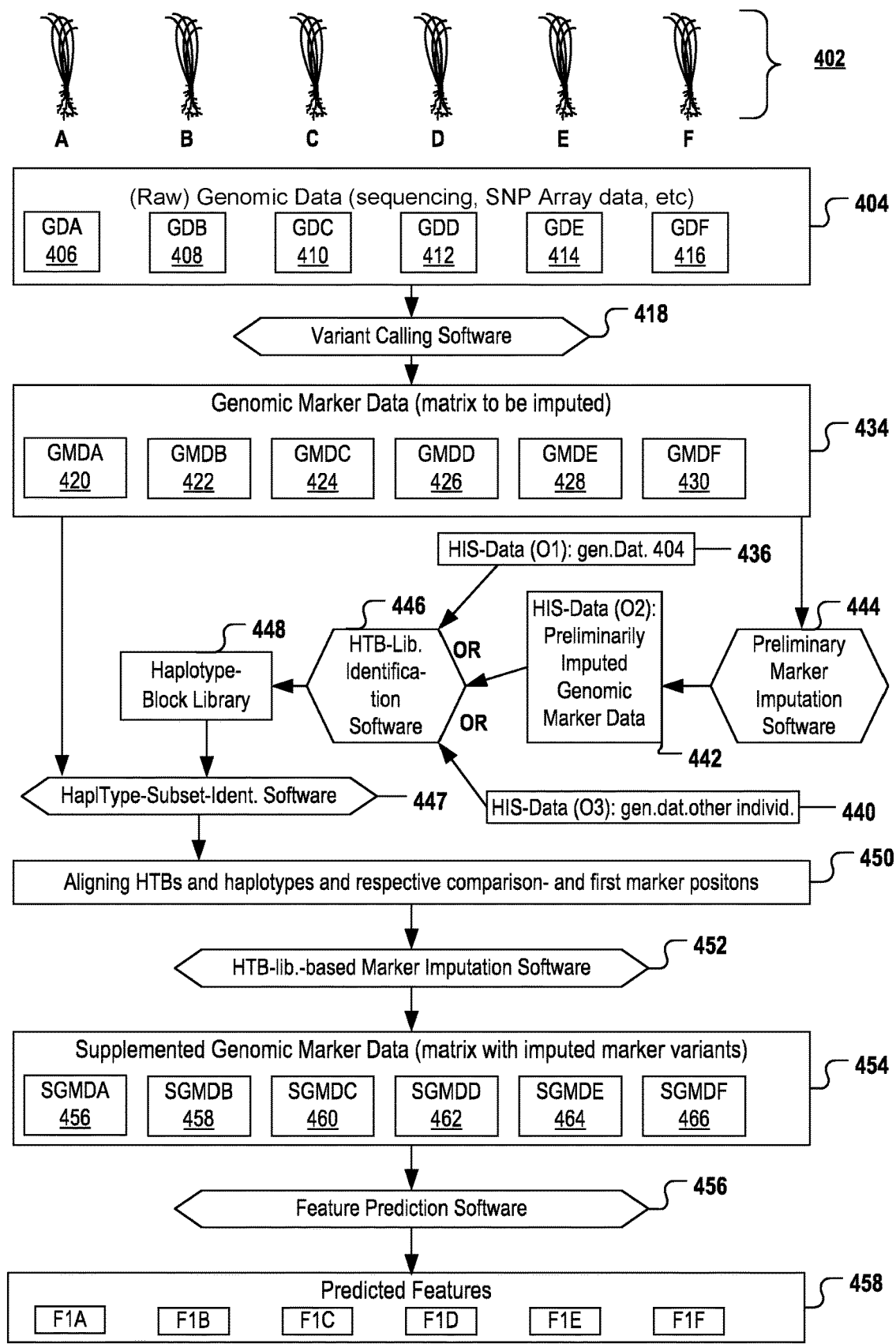
FIG. 4 a flow chart of a method for providing various data sources for computing the haplotype-block library and for performing the haplotype-block-library based imputation of the genomic markers.

FIG. 4 illustrates various datasets used in a method for computing the haplotype-block library and for performing the haplotype-block-library based imputation of the genomic markers.

Samples from a plurality of individuals A-F 402, e.g. plants of a double-haploid line are taken. For each of the samples, low-depth sequencing data 406-616 is obtained and provided as raw genomic data 404 being free of marker information.

In step 204, a variant calling software 418 identifies marker variants at various marker positions and provides genomic marker data 434, e.g. in the form of a matrix depicted in FIG. 5. The matrix comprises genomic marker data 420-430 in the form of assignments of marker variants to marker positions where the variant was observed. Some assignments may be ambiguous and some marker positions (identified by aligning marker positions of a reference genome to the genomic sequences) have not assigned a marker (missed calls), either because the marker position was not covered by a read or because the genome of the respective individual does not have a particular marker variant at this position (deletion, etc.).

In addition, a haplotype-block library 448 is computed. The library can be computed before, after or in parallel with the variant calling step. The library is computed by processing genomic data referred to as "HIS data" (haplotype-block identification source data) which is derived from individuals referred to as HIS individuals. Multiple options for generating the library exist: one option is to use the genomic marker data 434 directly as the HIS data. A modified version of this option is to perform a preliminary marker imputation on the genomic marker data 434 using an existing software 444 such as Beagle 5.0 for providing genomic marker data 442 with preliminarily imputed marker variants that is used as the HIS data. The preliminarily imputed marker variants are solely used for computing the library 448, not for providing the imputed markers in the imputed marker data 454. An alternative option is to use genomic sequence data 438 of the same individuals A-F based on a different data acquisition method (e.g. array, high-depth sequencing, etc. instead of the low-depth sequencing method used for obtaining the raw genomic data 404). A further alternative option is to obtain genomic sequence data 440 from other individuals H-O which are related to the individuals A-F, whereby the method for obtaining the data 440 can be identical to or can be different from the data acquisition technique used for obtaining the raw genomic data 404. For example, HIS data 440 can be high-depth or low-depth sequencing data or array data.

A haplotype-block identification software 446, e.g. HaploBlocker, analyzes the HIS data in order to identify haplotype-blocks. The totality of identified haplotype-blocks is stored and used as the "haplotype-block library" 448.

Then, a haplotype-block-library-based matching software 447 is applied on the genomic marker data 434 and identifies, for each of the haplotype-blocks in the library 448, a sub-set 450 of the haplotypes of the genomic marker data 434 comprising this haplotype-block. According to one example, HaploBlocker is used both for identifying the haplotype-blocks and as the software program 447 configured to identify sub-sets of haplotypes comprising a given haplotype-block.

For example, different approaches can be used for identifying haplotypes comprising the haplotype-blocks of the library 446. For example, if the genomic marker data 434 was also used as HIS data for computing the library, the information regarding the haplotypes comprising a haplotype-block may still be available from this step. In case genomic marker data of other but related individuals was used for computing the library, a sequence alignment between the sequence of each haplotype-block and the haplotypes in the genomic marker data 434 can be performed for identifying the sub-set. Alternatively, the alignment can be performed based on matching marker variants, e.g. marker variants assigned to marker positions in the genomic marker data 434 which are identical or similar to respective comparison marker variants of the haplotype-blocks in the library. The alignment or mapping of genomic marker data of the haplotypes (a haplotype corresponds to one individual in the case of haploid individuals) to the haplotype-blocks is performed for identifying sub-sets of the haplotypes (individuals) comprising this haplotype-block sequence at corresponding positions.

Then, these identified subsets are further processed by the marker imputation software 452. The haplotype subset-identification software 447 and the imputation software 452 can be implemented in different software programs or as modules of a single software program.

The marker imputation software 452 aligns the marker variants comprised in the sub-region corresponding to the genomic sequence of the haplotype-block of all the haplotypes in the sub-set to each other in order to perform marker-imputation for each marker position in the aligned sub-regions individually. The position-specific marker imputation is performed on marker positions that can correspond but may not necessarily correspond to a "comparison marker position" in the haplotype-block (because the respective marker variants may be contained in the genomic sequence delimited by the start and stop coordinates of the haplotype-block but may not have been documented/reported and assigned in the form of a "comparison marker variant").

The software 452 (which may be the same or a different program than the software 47) then identifies, for each of the marker positions within the aligned genomic sub-region of the haplotype-sub-set, the most frequently occurring marker variant and/or the marker variant supported by the greatest number of reads. If one or more additional threshold criteria are fulfilled, the most frequently observed marker variant and/or the marker variant supported by the greatest number of reads is assigned to this marker position as an "imputed" marker variant at least in all haplotypes of the sub-set having an ambiguous or missing variant assignment at this position.

According to embodiments, the haplotype-block guided marker imputation is performed on a per-haplotype basis. The marker variant at a given marker position of the currently processed haplotype is given a higher weight than the marker variants assigned to this position in other haplotypes of the sub-set of haplotypes used for performing the imputation, wherein the threshold-criterion takes into account both the frequencies of the marker variants assigned to this position in the haplotype-sub-set used for imputation and the weights assigned to the marker variants.

That the marker variants assigned to a currently imputed haplotype have a higher weight than the marker variants assigned to the corresponding position in the other haplotypes in the subset of haplotypes comprising a particular haplotype-block may be advantageous as this reduces the risk that a mutation-based variant is overwritten: for example, the threshold criteria requires the most-frequently observed variant must have a frequency of at least 80% at a given position in a currently processed sub-set of haplotypes. If the variant of the currently processed haplotype has assigned a variant observed at this position in 15% of the haplotypes of the subset, and 85% of the haplotypes have another marker variant at this position, the minority variant at this position would normally be overwritten. However, as the variants of the currently processed haplotype has assigned weights which are higher than that of the other haplotypes (while this haplotype is being processed and imputed), e.g. a weight of "x2", the minority marker has a weighted frequency of 2×15%=30% and the most frequently observed marker variant has a weighted occurrence of only 70 rather than 85%. Consequently, the marker variant of the currently processed haplotype is not overwritten.

According to other embodiments, in case the most frequent marker variant does not exceed the threshold and in case in the preliminary marker imputation step a marker could be imputed at a position where the variant itself has no supporting reads, the haplotype-block guided marker imputation step will not overwrite the preliminarily imputed marker at this position. Rather, the variant called e.g. using FreeBayes is entered as there is not enough evidence to overwrite the marker.

The genomic marker data having been supplemented with the imputed marker variants 454 is processed by a feature prediction software 456 for predicting one or more features 458 of the individuals A-F. For example, the predicted features can comprise one or more desired or undesired phenotypic traits which may be used for selecting a subset of the individuals A-F as part of a breeding project.

Figure 6:
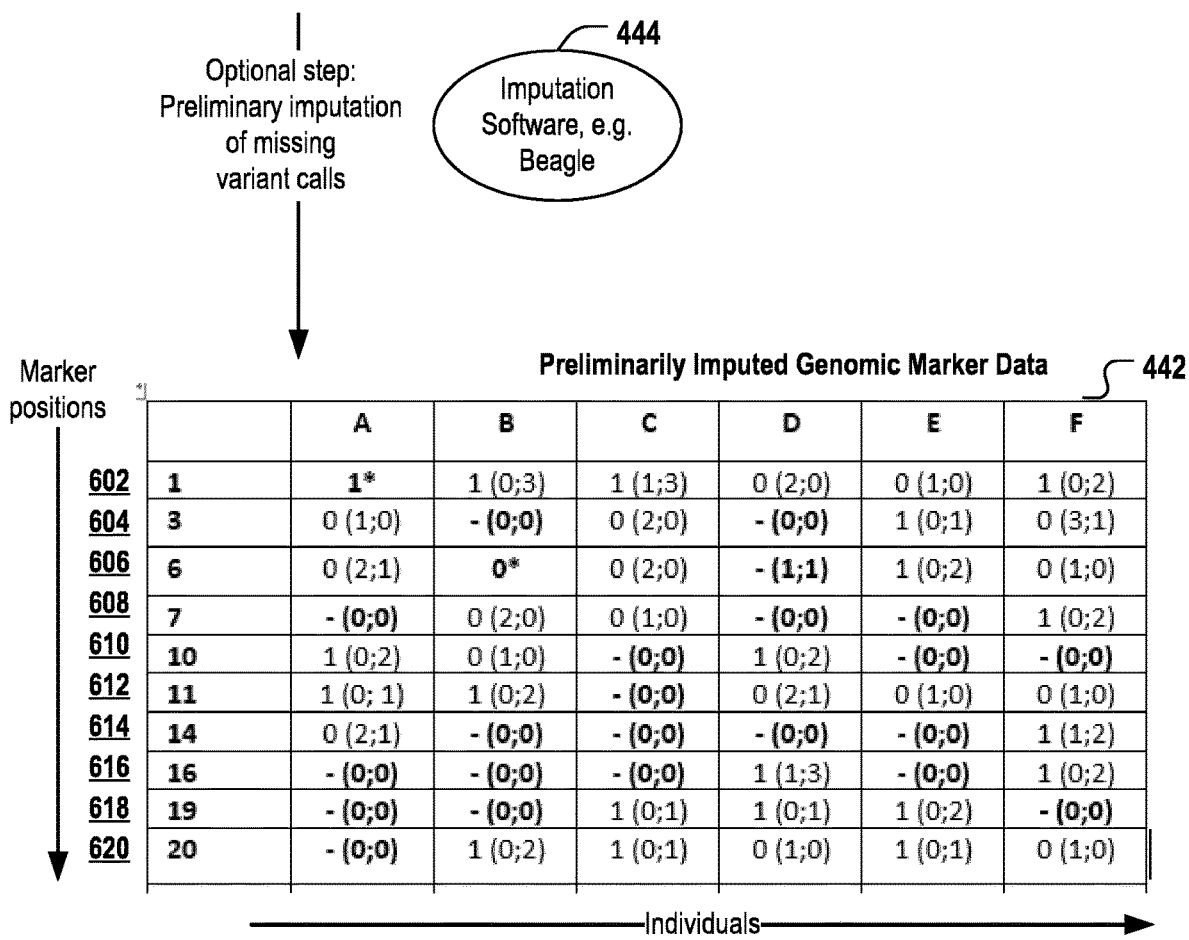
FIG. 6 the effect of an optional preliminary marker imputation step on a marker matrix.

FIG. 6 illustrates the effect of the optional preliminary marker imputation on the content of the marker matrix 434. The effect illustrated in FIG. 6 corresponds to the processing of the matrix to be imputed 434 by the preliminary marker imputation software 444 for providing the HIS data 442 illustrated in and already described with reference to FIG. 4. The HIS data 442 is also referred to as the "auxiliary imputed genotype matrix" or "preliminarily imputed genomic marker data". In the depicted example, the imputed positions are annotated with asterisks, e.g. P1 of individual A, or P6 of individual B.

It should be noted that the matrix depicted in FIG. 6 is for illustration only. Typically, the matrix 442 does not contain any missing calls after the preliminary marker imputation: current marker imputation software which can be used as the preliminary marker imputation software 444, e.g. Beagle 5.0 and others, will typically impute all or almost all missing calls.

Figures 7, 8:
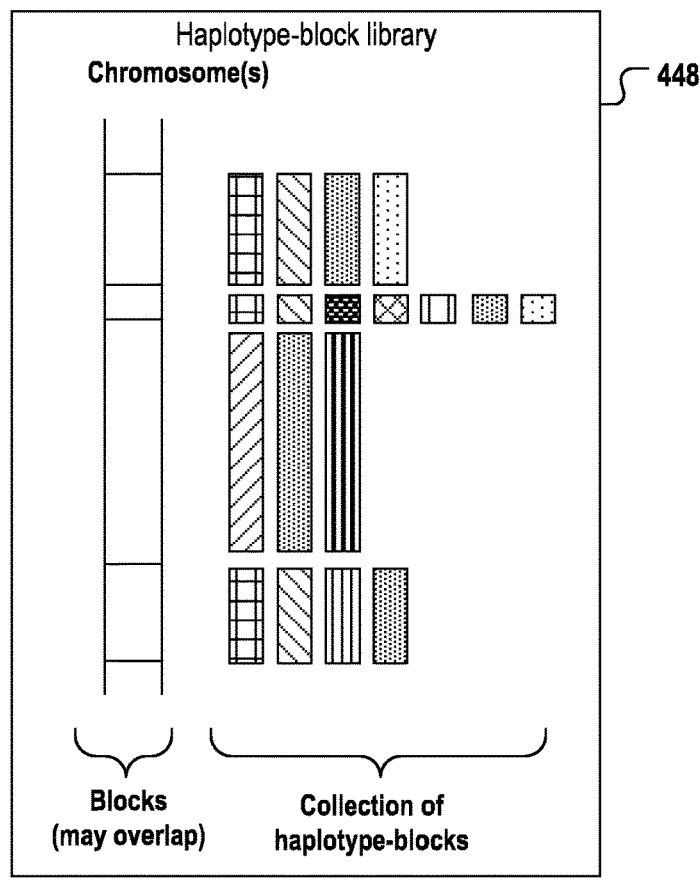
FIG. 7 a block chart of an exemplary haplotype-block library.
FIG. 8 the marker matrix to be imputed overlaid with matching haplotype-blocks of the library.

FIG. 7 shows a block chart of an exemplary haplotype-block library 448 obtained by applying existing haplotype-block detection programs like e.g. HaploBlocker on the HIS data provided. The HaploBlocker-based identification of a haplotype-block can be described as the identification of a common marker variant sequence in a set of haplotypes in the HIS data, whereby the identified common sequence of marker variants constitutes the comparison marker variant sequence.

HaploBlocker identifies start and stop coordinates of haplotype-blocks within the chromosomes of the HIS individuals. Some of the blocks may overlap (not shown). To each block, an in-between sequence of comparison markers is assigned, and the combination of the start and stop coordinates of the in-between sequence of comparison markers is referred to as haplotype-block. The different haplotype-blocks of the haplotype-library 448 output by HaploBlocker are indicated by different hatchings.

Then, each of the haplotype-blocks of the library is aligned with a sufficiently similar genomic sub-region (i.e., a matching genomic sub-region) of the haplotypes comprised in the genomic marker data 434 by the marker imputation software 452. The matching may be based e.g. an IDs of individuals providing the HIS data and the haplotypes and the start and stop coordinates, or based on a sequence alignment, or based on an alignment of comparison marker variants and marker variants of the haplotypes, etc.

FIG. 8 shows the marker matrix to be imputed 434 overlaid with matching haplotype-blocks of the library. In this schematic example, the sequenced genome of the individuals A-F is 20-bp long. The variant calling program has discovered and typed 10 marker positions (positions/sub-sequence loci) having assigned different marker variants (e.g. different nucleotides or SNPs) with positions 1, 3, 6, 7, 10, 11, 14, 16, 19 and 20. The Haplotype-block detection algorithm (e.g. the group-wise identity-by-descent detection algorithm of HaploBlocker) was conducted using the matrix 444 as HIS data input. The algorithm identified 5 haplotype-blocks 802-810, some of which overlap for individuals, as described below.

| haplotype-blocks | Positions on chromosome 1 | Sub-set of Haplotypes (for DH lines: individuals) determined to comprise the haplotype-block |
|---|---|---|
| 802 | 1-20 | 812: A, B, C |
| 804 | 1-10 | 814: D, E |
| 806 | 1-10 | 816: F |
| 808 | 11-20 | 818: A, B, C, E |
| 810 | 11-20 | 820: D, F |

According to embodiments, the sub-set of individuals which match a given haplotype-block is determined by performing a matching process described in greater detail with reference to FIGS. 9A and 9B. The marker positions comprised in a haplotype-block are referred to as "comparison marker position" and the marker variants occurring in a haplotype-block are referred to as "comparison marker variants". For example, the comparison marker positions and variants can be determined e.g. by comparing the haplotype-blocks with a reference genome sharing at least some marker variants and marker positions with the reference genome used in the initial calling step for providing the marker variants assigned to the first marker positions of the genomic marker data 434.

FIGS. 9A and 9B illustrate the haplotype-block-library guided marker imputation process in greater detail.

The process comprises sequentially selecting all haplotype-blocks 802-810 in the library 448. For each currently selected haplotype-block, the following sub-steps can be performed:

Subset-Identification: this step comprises identifying a sub-set of haplotypes (i.e., individuals in the case of haploid or doubled haploid individuals) of the totality of haplotypes comprised in the received genomic marker data 434 (or in the preliminarily imputed genomic marker data 442) which comprise a genomic sub-region that matches and/or can be mapped to the genomic sequence of the haplotype-block; for example, this step can comprise identifying haplotype-blocks as common paths in multiple haplotypes as described in Pook, T. et al.: "HaploBlocker: Creation of subgroup-specific haplotype-blocks and libraries", 2019, Genetics, 212(4), 1045-1061. Then, a sub-set of haplotypes is selected by first taking all haplotypes that exactly follow that path and then including all other haplotypes in this sub-set if their local marker sequences matched the path in at least a minimum number of marker positions, e.g. in at least 99% of the positions.

For example, the program HaploBlocker uses the above-mentioned path-based approach for identifying haplotype-blocks, and if the HIS individuals are identical to the individuals whose genomic marker data is to be imputed, the library identification step implicitly also identifies, for each of the haplotype-blocks, a sub-set of haplotypes comprising this haplotype-block. However, other approaches for identifying the sub-set of haplotypes comprising a particular haplotype-block can be used, e.g. by aligning marker variants of the haplotype with comparison marker variants at corresponding marker positions based e.g. on an edit distance and identifying the ones of the haplotypes whose edit distance to the comparison marker variants of the haplotype-block is below a maximum edit distance threshold.

Marker Position alignment: for each haplotype-block in the library, the genomic sub-regions of the haplotypes in the sub-set identified to comprise the haplotype-block are aligned; this means that for each marker position within the aligned sub-region, all marker-variants assigned to this position are determined. It should be noted that typically the haplotypes of a given subset will not all have a marker variant at identical positions. In addition, not each marker position of the haplotype may necessarily correspond to one of the comparison marker positions of the haplotype. However, as long as at least some of the marker variants of the haplotypes of the sub-set of haplotypes can be matched (are identical or sufficiently similar), the sequence of matching marker variants can be used for aligning the sub-regions of the sub-set of haplotypes comprising the same haplotype-block.

Identifying the most frequent and/or best supported marker variant in each position: Then, at each position in the aligned sub-region (but not in genomic sub-regions outside of the sub-region), the most frequently observed marker variant and/or the marker variant supported by the greatest number of reads is determined.

Marker imputation: in this step, after the marker variant having been assigned to this marker position most frequently in the sub-set or being supported by the greatest number of reads at this position was determined, one or more additional threshold criteria are evaluated, e.g. if the determined marker variant was observed at least in a minimum number of haplotypes of the sub-set, whereby the minimum number may be given as absolute or relative (e.g., percentage) value. If this criterion is fulfilled, the determined marker variant is assigned to the currently examined marker position in all haplotypes of the sub-set or at least to the currently examined marker position of those haplotypes which comprise an ambiguous marker assignment or a missing marker assignment at this position. For example, if at position P55 93% of the haplotypes (individuals) of the sub-set had assigned marker variant MV1 and 0.2% of the haplotypes had assigned marker variant MV2 at position P55, and if the threshold criterion for marker imputation is 80%, then the most frequent marker variant MV1 will be assigned to position P55 in all haplotypes (individuals), including those 0.2% having assigned marker variant MV2 and the haplotypes having a missing or ambiguous call at position P55. In other embodiments, the determined marker variant is assigned only to second marker positions, i.e., marker positions having ambiguous marker assignments and missing assignments, not to respective positions in haplotypes having unambiguously assigned another marker variant like MV2. This may have the advantage that the information regarding marker variant MV2 (which may be the result of a mutation and not of a sequencing error) is not over-written. According to embodiments, this step can be used for correcting genotyping errors corresponding to haplotypes (individuals) with ambiguous calls by replacing the ambiguous marker variant with an imputed marker variant. According to some embodiments, the threshold criterion can be based on a combination of absolute or relative counts of the different marker variants, or a combination of both. For example, a criterion may be "at least 10 reads supporting a particular marker variant and above 80% of the total haplotypes (individuals) in the sub-set of haplotypes (individuals) comprising this variant at this position.

According to some embodiments, solely "second" marker positions are imputed, i.e. marker positions having missing or ambiguous marker assignments. An ambiguous call is a non-missing call that reports the presence of at least two different marker variants at the same marker position. This may prevent erroneously over-writing private or rare alleles as sequencing or calling errors.

According to other embodiments, any marker assignment comprised in the genomic marker data 434 that is supported only by a number of reads (e.g. 1) that is below a minimum number threshold are considered ambiguous and are replaced by the most frequent marker variant observed in the sub-set of haplotypes (individuals) provided the "most frequent marker variant" is supported by more reads than the currently assigned marker variant.

According to some embodiments, the haplotype-block library comprises overlapping haplotype-blocks. A genomic sub-region comprised in all of the two or more overlapping haplotype-blocks is referred to as the "intersecting region" of the overlapping haplotype-blocks. In this case, marker positions and respectively assigned marker variants within the intersecting region of all haplotypes comprising this intersecting region are aligned and the most frequently assigned marker variant and/or the marker variant supported by the greatest number of reads is determined for a given marker position based on the marker variants assigned to this position in totality of haplotypes comprising at least one of the overlapping haplotype-blocks. When haplotype (individual) A shares a haplotype-block HBX1 with [A,B,C] and another, overlapping haplotype-block HBX2 with [A,C,D, E], and the imputation is performed for a position Pint in the intersecting region of HPX1 and HBX2, then marker variants and/or reads assigned to position Pint in the haplotypes [A,B,C,D,E] are considered for haplotype A. So for marker positions comprised in an overlapping region of two or more different haplotype-blocks, the haplotype-block-guided marker imputation can take into account marker information of all haplotypes (individuals) comprising any one of the two or more different haplotype-blocks.

In the example depicted in FIG. 9A, at position P3 604 in the matrix to be imputed 434, a sub-set of three haplotypes (individuals) {A, B, C} is identified to comprise the haplotype-block 802. For haplotype (individual) A, one read (indicated by the read count "1" at 834) supports variant "0" and zero reads (indicated by the read count "0" at 836) support variant "1", therefore marker variant "0" is assigned at 832 to marker position P3 of A. For haplotype (individual) B, the variant call is missing ("-"). For haplotype (individual) C, two reads (indicated by the read count "2" at 840) supports variant "0" and zero reads (indicated by the read count "0" at 842) support variant "1", therefore marker variant "0" is assigned at 838 to marker position P3 of C. The summation of marker variants from haplotypes (individuals) {A, B, C} results in 3 counts of a first one ("0") out of two known marker variants and 0 counts of the alternative marker variant ("1"). That is, 3 counts out of 3 total counts or 100% support the marker variant "0". Hence, the matching score obtained for the variant "0" at P3 in the sub-set {A, B, C} is 100% This exceeds a pre-determined threshold, e.g. 80%. As a result, haplotype (individual) B is assigned the imputed marker variant "0" 844 shown with an asterisk.

FIG. 9B shows the completely imputed matrix 454.1 obtained by performing the above-described haplotype-block library-guided marker imputation on the genomic marker data matrix 434. Depending on the threshold criterion used, the number of imputed marker variants and hence the imputed matrix 454.1 may vary. For example, with a threshold criterion that marker imputation should only be performed on a marker position whose most frequently observed marker variant was observed in at least 80% of all haplotypes of the sub-set, the position P11 of haplotype B and the positions P11 and P14 of haplotype C would not have been imputed as indicated in FIG. 10B, because the supporting reads have a 2:1 ratio and the most frequently observed marker variant/read hence is below the 80% threshold and does not fulfill the threshold criterion.

FIGS. 10A and 10B illustrate the haplotype-block-library guided marker imputation process for structural marker variants in greater detail.

The read-depth of the genomic sub-regions of the haplotypes corresponding to the comparison marker sequences of the haplotype-blocks in the library can be increased massively after the haplotype-block guided marker imputation step, because a large number of marker position formerly lacking a marker variant now have assigned an imputed marker variant, which can be considered to represent a an imputed, computationally simulated read. Hence, combining the haplotype-block guided marker imputation with an optional step of detecting ("calling") structural variants, and in particular CNVs, may have the advantage that structural variants can be identified although the genomic raw data obtained e.g. in a sequencing or array-based data acquisition step may be too sparse ("low depth") to allow the identification of structural variants.

The haplotype-block-library-guided marker imputations according to embodiments of the invention allows performing copy-number-variation (CNV) and insertion-deletion calling and the imputation of missing or erroneously called structural marker variants. Structural variants are identified via deviations of an observed local read depth from the expected local read-depth (or number of called marker variants). According to some embodiments, a local smoothing function is applied on the resulting read-depth. This could for example be done by the use of window-based averages or kernel density estimation.

Hence, according to embodiments, the method further comprises performing a structural marker variant calling, e.g. a copy-number variation calling and/or an insertion-deletion calling, and the imputation of missing or erroneously called structural marker variants, whereby a structural marker variant is called as a function of an observed number of reads in relation to an expected number of reads in the genomic sub-regions of a subset-of individuals comprising a given haplotype-block, whereby the sub-regions correspond to the genomic sub-region within the start and stop coordinates of the said haplotype-block.

The analysis of the distribution of read depth across haplotypes allows the discovery of structural variants such as presence-absence polymorphisms or copy-number variants.

Each of the haplotype-blocks in the library comprises start and stop coordinates of a genomic sub-region comprising a sequence of comparison marker positions. Haplotype-blocks (and hence the genomic sub-region delimited by the start and stop coordinates) can span over huge chunks of the genome, often up to 10 MBp and more. Reads are usually much smaller (e.g. 80 bp or 150 bp in some experimental settings, but other read length are also commonly obtained) and the read depth will be impacted by the number of reads that are overlapping with a given marker.

According to one example, for each of the haplotype-blocks in the library, the flowing steps can be performed:

a sub-set of haplotypes comprising the haplotype-block (i.e. comprising a genomic sub-region which can be aligned to the haplotype-block) is selected;

then, in an optional step, for each of the haplotypes of the sub-set, an estimated smoothed read depth profile of the haplotype's genomic sub-region that can be aligned to the haplotype-block and that comprises the marker variants imputed in the haplotype-block guided marker imputation process is computed using a smoothing function, in particular a kernel regression method, e.g. a Nadaraya-Watson-estimator (E. A. Nadaraya, "On Estimating Regression", Teor. Veroyatnost. i Primenen., 9:1 (1964), 157-159; Theory Probab. Appl., 9:1, 1964, 141-142) with a Gaussian kernel and set bandwidth (e.g. 0.25 Mega base pairs MBp). This estimated, smoothed read depth profile of the genomic sub-region of the haplotype is also referred to as "estimated haplotype read depth" profile (or "estimated smoothed haplotype read depth" profile) of the haplotype. Using a kernel regression method will have the beneficial effect of smoothing as the number of reads at different marker positions is highly variable. The kernel regression step may introduce some bias in the estimation, as the variance is reduced, also the mean-squared-error (MSE) is substantially reduced. The estimated smoothed read depth profile is estimated for each haplotype in the subset of haplotypes comprising the above-mentioned haplotype-block. This may allow avoiding issues of high per marker variance in read depth. By adjusting the bandwidth of the smoothing function the resolution of the identification can be adapted to specifically target short/long copy-number variation.

an average read depth profile of all haplotypes in the sub-set of haplotypes comprising the haplotype-block is computed; in case the optional smoothing step is performed, the average read depth profile is computed from the estimated smoothed read depths profiles of all haplotypes in the sub-set;

afterwards, for each of the haplotypes in the sub-set of haplotypes comprising the haplotype-block, and for each "local region" (typically covering about one or a few marker positions) within the sub-region of the haplotype alignable to the haplotype-block, an observed local read-depth is determined by counting the number of haplotype variants (including the marker variants imputed in the haplotype-block guided marker imputation) assigned to the marker positions within this "local region"; the size of the local region can vary greatly with species, marker type and genome particularities. Indels or genome rearrangements can be tracked in local regions ranging from 2 bp to several Mbp;

for each of the haplotypes and for each of the marker positions or for each "local region") comprised therein, the observed local read-depth is compared against the corresponding value of the average read depth profile; if the ratio of observed/average read depth of this local region in this haplotype above or below a threshold, a CNV is identified at this position; for example, if the ratio of observed/average read depth of this local region in this haplotype above a threshold, e.g. 1.3, the local region is classified as multiplication; if the ratio of the local region is below a threshold, e.g. below 0.7, the local region is classified as deletion.

Calling of structural variation usually requires genomic marker data having a read depth of at least 10×. As of today, CNV calling with 0.5× data is basically impossible. Embodiments of the invention may be highly advantageous as thanks to the HB-guided marker imputation which computationally increases the number of markers (considered to represent reads), it is possible to use and process genomic data with an average read-depth of e.g. 83× instead of 0.5×.

For example, the marker imputation software according to embodiments is configured to call a deletion-marker-variant when the local read-depth obtained at a particular marker position falls below a predefined threshold, e.g. when reads of 30 lines with a read-depth of 0.5× are locally merged, a read-depth of 15× is expected. Obtaining less than 11 reads (15*0.7) therefore would be called as a deletion will more than 19 reads (15*1.3) would be indicated as a potential multiplication. A multiplication as used herein is an increase in the copy number of a marker variant in a haplotype compared to a reference, whereby the multiplication can be a duplication, a triplication or an even greater multiplication. Commonly, all these forms of multiplications are referred to as "duplications". Only reads supporting the called variant are counted.

Deletions and multiplications can then be coded as binary marker variants, e.g. DEL or MULT.

For simplicity reasons in the example depicted in FIGS. 10A and B, it is assumed that only the marker itself is impacting the local read count used in the CNV calling method. Furthermore, the haplotype is assumed to have the same weight as the other haplotypes in the sub-set used for computing the average read-depth profile. In some other embodiments, the reads of the haplotype currently processed tor identifying CNVs have assigned a higher weight than the reads of the other haplotypes of the sub-set, implying that the reads of the haplotype are multiplied with a weighing factor. For haplotype-block 5 (810) there are 3 reads in marker 11, 2 reads in marker 14, 5 reads in marker 16, 1 read in marker 19 and 2 reads in marker 20. When assuming an average read depth of 1×, we would expect 2 reads per marker resulting in deletion calls for marker 19 and a multiplication call for marker 16. The total number of haplotypes per block in real-world examples will be substantially higher.

FIG. 10B shows the matrix 454.2 obtained by performing marker imputation for structural markers based on the genomic marker data matrix 434. As a result of the CNV calling, an additional line "16_CNV" with binary coding to indicate if a CNV is present at a given position (which may correspond to a "local region" mentioned above is added to the matrix 434. Imputed deletion variants are indicated as "DEL*" and imputed multiplication variants are indicated as "MULT*".

After imputation, the number of positions with missing calls is reduced significantly from the raw genotype matrix. In addition, erroneous calls stemming from sequencing or variant calling errors have to a large extent been corrected. As a result, the genotype matrix obtained at the end of the workflow has higher resolution and accuracy. This allows more accurate and robust statistical analysis on the population of individuals genotyped downstream.

Figure 11:
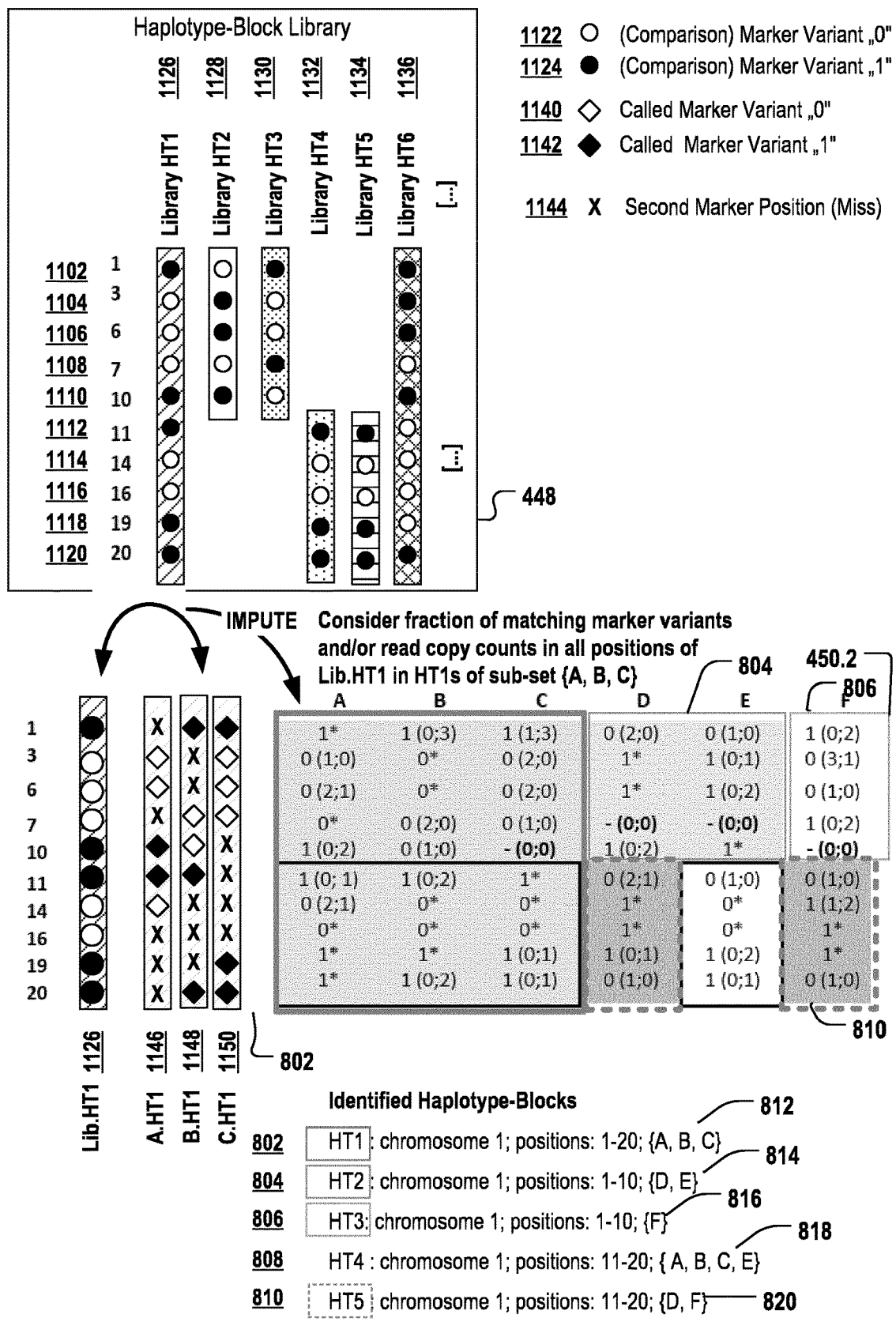
FIG. 11 the haplotype-block based matching and marker imputation on a per-marker basis.

FIG. 11 illustrates a haplotype-block guided matching and marker imputation on a per-marker-position basis. The haplotype-block library 448 comprises a plurality of haplotype-blocks 1126-1136 respectively comprising different sub-sequences of comparison marker positions 1102-1120 and respectively assigned comparison marker variants 112, 1124. For the sake of simplicity, the haplotype-blocks in the depicted example are non-overlapping and have comparison marker positions which are identical to respective marker positions in the haplotypes A, B, C, D, E F comprised in the genomic marker data 434. Each haplotype can correspond to a respective individual in the case the individuals are haploid or DH haploid individuals.

In the lower left part of FIG. 11, an alignment of the comparison marker positions of the haplotype-block 1126 with a genomic sub-region 1146, 1148, 1150 of haplotypes A, B and C comprising the haplotype 1126 is shown. Typically, the haplotypes A, B, C are much longer than their genomic sub-regions aligned with the haplotype-block 1126 (not shown).

At (comparison) marker position 1, haplotypes B and C have assigned marker variant "1". In the genomic marker data 434, position 1 is a "second marker position" in haplotype A, because no reads have been obtained for A at position 1 and A hence does not have assigned any marker variant. As a result of the preliminary marker imputation, position 1 of haplotype A in the preliminarily imputed marker data 442 has assigned marker variant "1", but this information is ignored in the marker imputation step. Hence, as A does not have a marker variant assigned, and as B and C at position 1 together have 6 reads supporting the marker variant "1", variant "1" is the marker variant in the sub-set A, B and C at position 1 having the greatest number of supporting reads and is assigned as imputed marker variant to the position 1 of haplotype A.

At (comparison) marker position 3, haplotypes A and C have assigned marker variant "0". In the genomic marker data 434, position 3 is a "second marker position" in haplotype B, because no reads have been obtained for B at position 3 and B hence does not have assigned any marker variant. As a result of the preliminary marker imputation, position 3 of haplotype B in the preliminarily imputed marker data 442 has assigned marker variant "0", but this information is ignored in the marker imputation step. Hence, as B does not have a marker variant assigned, and as für A and C at position 3 in total 3 reads were obtained supporting the presence of variant "0", variant "0" is the marker variant in the sub-set A, B and C at position 3 with the greatest number of supporting reads and is assigned as imputed marker variant to the position 3 of haplotype B.

This procedure is repeated for each of the marker positions 6, 7, 10, 11, 14, 16, 19 and 20, thereby imputing missing and/or ambiguous marker variants in the genomic sub-regions 1146-1150 in each of the haplotypes A, B and C.

In other implementation examples, e.g. examples using array data as data to be imputed, instead of the reads the most frequently observed marker variant at a given position can be used instead of the variant having the greatest number of supporting reads.

Figure 12:
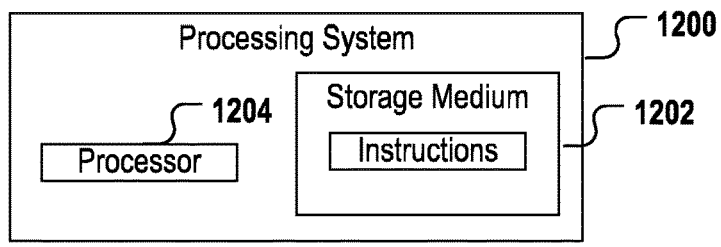
FIG. 12 a computer system for performing a prediction of a genomic feature.

FIG. 12 is a block diagram of a computer system 1200 that is used for performing a prediction of a genomic feature. The computer system comprises one or more processors 1204 and a data storage medium 1202. The data storage medium comprises computer-interpretable instructions for performing the marker imputation and for using the imputed marker data for predicting a genome-related feature of one or more individuals as described herein for embodiments of the invention. For example, the instructions can be implemented as a set of application programs, scripts and/or program modules which are functionally integrated as to provide a marker imputation pipeline. The pipeline may comprise a module for performing a phasing step, for performing an initial calling step, for performing a preliminary marker imputation based on state-of-the art software programs, for computing the haplotype-block library, for performing the library-guided marker imputation, for performing one or more downstream feature predictions based on the imputed marker data (e.g. for performing a GWA), and/or for identifying structural marker variants. The computer system can comprise a GUI for outputting the processing results to a user.

FIG. 13 shows a plot 1302 showing estimated read depths for each of a plurality of different markers computed based on low and high read depth sequence data. Read depths are smoothed using a Nadaraya-Watson estimated with gaussian kernel and 25 SNP bandwidth to provide the smoothed curve 1306. The equalizing line 1304 and the curve 1306 indicate that based on the haplotype-block-library guided marker imputation accruing to embodiments of the invention, marker-imputed low-depth sequencing data may be as suited for calling structural marker variants as high depth sequencing data.

FIG. 14 shows read depths having been estimated for a particular maize line via the use of high read depth sequence data (NB), or via low read depth sequence data that was marker-imputed using the haplotype-block library-guided marker imputation method according to embodiments of the invention "HBimpute" (C/D), or via raw low depth sequence data (E/F). All plots relate to an exemplary chosen segment of chromosome 10. The read depth peaks of FIGS. 14A/C and local patterns depicted in FIGS. 14B/D match, thereby proving that genomic marker data imputed according to embodiments of the invention can be used for identifying structural marker variations like deletions or multiplications of particular markers.

FIG. 15 shows a plot showing the performance of different imputed datasets used in a genome-wide-association-study on simulated phenotypes and therefore known underlying regions. For each trait 10 underlying QTL were simulated with 5 QTL position randomly drawn and evaluated based on the 600 k data and 5 QTL positions drawn and evaluated based on the HB-seq data. Heritability $h^2$ of the simulated traits was assumed to be 0.5 with all 10 QTLs having equal effect size. In addition to the imputed datasets the 600 k array data was also down sampled to artificially generate low density SNP arrays (10, 50 k). Markers above a certain p-value were put in a joined region in case they are at most 1 MBp apart from each other and a region was considered a positive hit in case the underlying QTL was at most 1 MBp away from the region. The given procedure was repeated for 5.000 separately simulated traits. HB-seq-filt represents the HB-seq while excluding all marker positions not present on the 600 k array. HB-seq-large represents a case of HB-seq with less strict quality control filtering to obtain a SNP panel with about 1.35 million SNPs.

LIST OF REFERENCE NUMERALS

102-108 steps
120 step
130-134 steps
202-206 steps
302 step
402 individuals (doubled haploid)
404-416 raw genomic data
418 variant calling software
420-434 genomic marker data
436 HIS data
440 HIS data
442 HIS data
444 state of the art marker-imputation software
446 haplotype-block library
447 haplotype-block-library-based matching software
450 aligned haplotype-blocks and genomic marker data
452 haplotype-block-library-guided marker imputation software
454 marker data supplemented with imputed markers
456 feature prediction software
458 predicted features
502 sequencer
504 phasing software
505 reference genome
602-620 lines of matrix representing marker positions
802-810 haplotype-blocks of library
812-820 sub-sets of haplotypes/individuals comprising a haplotype-block
832, 838 assigned marker variant
834, 840 number of reads supporting variant "0"
836, 842 number of reads supporting variant "1"
844 imputed marker variant
1122 comparison marker variant "0"

1124 comparison marker variant "1"
1140 called marker variant "0"
1142 called marker variant "1"
1144 second marker position
1146-1150 aligned genomic sub-regions
1200 computer system
1202 storage medium
1204 processor
1302 plot of observed and expected coverage
1304 balance line
1306 smoothed read-depth curve

The invention claimed is:

1. A method for predicting a genome-related feature from genomic marker data of multiple individuals, the method comprising:
  receiving, at a computing device, genomic marker data of each of the individuals, the multiple individuals comprising one haplotype or multiple haplotypes respectively, the genomic marker data of an individual being indicative of a plurality of marker positions in the genome of the individual, wherein first ones of the marker positions are respectively assigned to a marker variant identified at this first marker position, wherein multiple second ones of the marker positions have a missing or ambiguous marker variant assignment;
  computing, at the computing device, a haplotype-block library comprising a plurality of haplotype-blocks, each haplotype-block comprising start and stop coordinates and a series of marker positions referred to as 'comparison marker positions' lying within the start and stop coordinates;
  performing, at the computing device, a haplotype-block-guided marker imputation of marker variants at the second marker positions selectively within genomic sub-regions whose start and stop coordinates correspond to the start and stop coordinates of one or more of the haplotype-blocks, whereby the imputation is computed as a function of marker variants comprised in the genomic sub-regions of a sub-set of the haplotypes, the haplotypes of the sub-set of the haplotypes comprising the one or more haplotype-blocks;
  supplementing, at the computing device, the genomic marker data of the multiple individuals by assigning the imputed marker variants to respective ones of the second marker positions;
  using, at the computing device, the supplemented genomic marker data for computationally predicting the feature of the individuals; and
  conducting a plant or animal breeding project by:
    providing a group of candidate plant or animal individuals, wherein a candidate individual is a respective individual potentially to be used in the breeding project, the feature being indicative of a breeding value of the candidate individuals or their offspring; and
    selecting and using ones of the candidate individuals as parent individuals in the breeding project whose predicted breeding value is the highest.

2. The method of claim 1, the performing of the haplotype-block guided marker imputation comprising, for each of the haplotypes of the individuals:
  selecting the one or more genomic sub-regions in this haplotype whose start and stop coordinates correspond to the start and stop coordinates of one or more of the haplotype-blocks;
  for each of the one or more selected genomic sub-regions of the haplotype and for each of one or more of first and second marker positions lying within the selected genomic sub-region:
  identifying one or more of the haplotype-blocks comprised in this haplotype and whose start and stop coordinates delimit a genomic sub-region covering the marker position;
  identifying a sub-set of the haplotypes of the individuals, the haplotypes of the subset being haplotypes comprising the one or more identified haplotype-blocks;
  identifying the marker variant that is assigned most frequently to this marker position within the identified sub-set of haplotypes; and
  if a threshold criterion is met, assigning the most-frequently assigned marker variant to the marker position, wherein the threshold criterion is in particular one or more of a minimum marker variant count of the most frequently assigned marker variant and a minimum ratio of the marker variant count of the most frequently assigned marker variant to the number of haplotypes in the sub-set of haplotypes.

3. The method of claim 1, each of the first marker positions having assigned one or more count-parameters, each count-parameter representing a marker variant and having assigned a numerical value indicating the copy number of sequence reads comprising the marker variant represented by the counter parameter, the performing of the haplotype-block guided marker imputation comprising, for each of the haplotypes of the individuals:
  selecting the one or more genomic sub-regions in this haplotype whose start and stop coordinates correspond to the start and stop coordinates of one or more of the haplotype-blocks;
  for each of the one or more selected genomic sub-regions of the haplotype and for each of one or more of first and second marker positions lying within the selected genomic sub-region:
  identifying one or more of the haplotype-blocks comprised in this haplotype and whose start and stop coordinates delimit a genomic sub-region covering the marker position;
  identifying a sub-set of the haplotypes of the individuals, the haplotypes of the subset being haplotypes comprising the one or more identified haplotype-blocks;
  computing an aggregated read count for each of the marker variants assigned to this position in all haplotypes in the sub-set by aggregating the numerical values of all count parameters representing the same marker variant;
  identifying the marker variant for which the highest aggregated read count was computed; and
  if a threshold criterion is met, assigning the marker variant supported by the highest read-count to the marker position in each of the identified genomic sub-regions of the sub-set of haplotypes, wherein the threshold criterion is in particular one or more of a minimum aggregated read count threshold and a minimum ratio of the highest aggregated read count to the total number of reads in the sub-set of haplotypes covering this marker position.

4. The method of claim 2, each comparison marker position having assigned a marker variant referred to as 'comparison marker variant', the sub-set of haplotypes comprising the haplotype-block being determined by matching the haplotype-block with each of the haplotypes of the multiple individuals, the matching comprising:

aligning comparison marker positions of the haplotype-block with corresponding first or second marker positions of the haplotype;

comparing the comparison marker variants with the marker variants of the haplotype assigned to respectively aligned first marker positions;

computing a matching score for the aligned haplotype-block and haplotype pair as a function of the number comparison marker positions aligned to first marker positions having assigned a marker variant that is identical or sufficiently similar to the aligned comparison marker variant;

if the matching score exceeds a threshold, identifying the haplotype as a haplotype which comprises the haplotype-block.

5. The method of claim 1, further comprising, for each haplotype of a sub-set of haplotypes comprising one of the haplotype-blocks, and for each of the marker positions or local region comprised in this haplotype:

determining an observed local read-depth at the marker position or local region, whereby the marker variants imputed in the haplotype-block-guided marker imputation respectively represent a read;

determining an average local read depth at the marker position or local region as an average of the corresponding marker position or local region of all haplotypes of the sub-set;

identifying a ratio of the observed local read-depth and the average local read depth at the marker position or local region;

if the ratio is below a minimum threshold or above a maximum threshold, identifying a structural marker variant at this position, wherein the structural marker variant is in particular a copy-number variant (CNV).

6. The method of claim 1, further comprising:

receiving genomic data of the genome of each of the individuals;

processing the genomic data for identifying marker variants at a plurality of marker positions in the genome of each individual, thereby assigning first ones of the marker positions to marker variants identified at the respective first marker positions, whereby for multiple second ones of the marker positions no marker variant is identified or an ambiguous marker variant assignment is made; and providing the processed genomic data comprising associations of marker positions and the respectively assigned marker variants as the genomic marker data.

7. The method of claim 6, wherein the individuals are haploid or doubled haploid organisms or are a group of inbred organisms, each individual comprising a single haplotype, the processing of the genomic data for identifying the marker variants at the plurality of marker positions preferably being free of a phasing process, the phasing process being a haplotype-block-based identification of markers in the single haplotype of each of the plurality of individuals; or wherein the individuals are diploid or polyploid organisms, the method preferably further comprising performing a phasing process for providing two or more haplotypes for each of the individuals.

8. The method of claim 1, the individuals being selected from a group comprising:

individuals with a haploid genome;
individuals with a doubled-haploid genome;
individuals of an inbred species, race or variety;
individuals with a diploid genome;
individuals with a polyploid genome;
wherein the individuals preferably are plants or animals or humans.

9. The method of claim 1, the prediction of the feature being selected from a group comprising:

genotyping at least one of the multiple individuals, in particular for one or more of identification of individuals with particular traits, and breeding or research;

identifying the candidate individuals for use in the breeding project;

performing genome-wide association-studies (GWAs).

10. The method of claim 1, the genomic marker data being based on genomic data of the genomes of the individuals, whereby the genomic data being selected from a group comprising:

low-depth sequencing data of the individuals, wherein low-depth sequencing data has a coverage of less than 10; or ultra-low-depth sequencing data of the individuals, wherein ultra-low-depth sequencing data has a coverage of less than 1-fold.

11. The method of claim 1, the providing of the haplotype-block library comprising:

providing haplotype-block identification source data (HIS data), the HIS data being the genomic data of a plurality of haplotype-block identification source individuals (HIS individuals), wherein the plurality of HIS individuals comprises all or at least some of the individuals whose feature is to be predicted and wherein the HIS data is the genomic data to be imputed; or wherein the plurality of HIS individuals comprises all or at least some of the individuals whose feature is to be predicted and wherein the HIS data is genomic data obtained through a genomic determination method which is different from the genomic determination method used for obtaining the received genomic marker data of the multiple individuals; or wherein the plurality of HIS individuals from whom the HIS data is derived do not comprise the individuals whose feature is to be predicted and rather comprise individuals related to these individuals, wherein the HIS individuals can in particular comprise individuals which are genetically related to the multiple individuals, the HIS individuals in particular being individuals belonging to the same phylogenetic taxon, a same species as the multiple individuals or a same sub-species as the multiple individuals;

applying a haplotype-block-identification software on the HIS data for identifying a plurality of haplotype-blocks; and providing the identified plurality of haplotype-blocks as the haplotype-block library;

wherein the HIS data is in particular genomic sequencing data comprising marker positions associated with marker variants; or DNA array data, in particular SNP array data or structural variant (SV) data.

12. The method of claim 1, wherein the predicted feature is further selected from a group comprising:

a likelihood of comprising a favorable trait;

an indication that the individual has the highest likelihood of comprising an undesired trait;

a likelihood of comprising one or more of a favorable combination of two or more traits and an indication of the favorable combination;

a likelihood of comprising one or more of an undesired combination of two or more traits and an indication of the undesired combination;

a likelihood of occurrence of a favorable or of an undesired trait in an offspring of two of the individuals;

a likelihood of a genomic marker variant of being associated with one or more traits of the individuals.

13. A method for predicting a genome-related feature from genomic marker data of multiple individuals, the method comprising:

receiving, at a computing device, genomic data of each of the individuals, the multiple individuals comprising one haplotype or multiple haplotypes respectively;

computing, at the computing device, a haplotype-block library comprising a plurality of haplotype-blocks, each haplotype-block comprising start and stop coordinates and a series of marker positions referred to as 'comparison marker positions' lying within the start and stop coordinates;

performing, at the computing device, a haplotype-block-guided marker imputation of marker variants selectively within genomic sub-regions of the haplotypes whose start and stop coordinates correspond to the start and stop coordinates of one or more of the haplotype-blocks, whereby the imputation comprises aligning genomic sub-regions of sub-sets of the haplotypes comprising the same haplotype-block with each other, whereby the start and end of the aligned sub-regions corresponds to the start and stop coordinates of the shared haplotype-block, and applying a variant calling software on the aligned genomic sub-regions, whereby the variant calling software uses the aligned sub-regions of each sub-set of haplotypes as reads obtained for this sub-region;

supplementing, at the computing device, the genomic data of the multiple individuals by assigning the imputed marker variants to respective marker positions;

using, at the computing device, the supplemented genomic marker data for computationally predicting the feature of the individuals; and conducting a plant or animal breeding project by:

providing a group of candidate plant or animal individuals, wherein a candidate individual is a respective individual potentially to be used in the breeding project, the feature being indicative of the breeding value of the candidate individuals or their offspring;

selecting and using ones of the candidate individuals as parent individuals in the breeding project whose predicted breeding value is the highest.

14. The method of claim 13, the performing of the haplotype-block guided marker imputation comprising, for each of the haplotypes of the individuals:

selecting one or more genomic sub-regions in this haplotype whose start and stop coordinates correspond to the start and stop coordinates of one or more of the haplotype-blocks;

for each of the one or more selected genomic sub-regions of the haplotype:

identifying a sub-set of the haplotypes, the haplotypes in the sub-set sharing at corresponding sub-regions one or more of the haplotype-blocks with each other;

aligning the sub-region of the haplotype with the corresponding sub-region of the other haplotypes in the subset;

performing a marker variant calling step on the aligned sub-regions for calling marker variants in the sub-region of the haplotype, whereby the sequence information in the aligned sub-regions of the other haplotypes of the sub-set are used as reads.

* * * * *